United States Patent
Himberger et al.

(10) Patent No.: US 8,146,016 B2
(45) Date of Patent: Mar. 27, 2012

(54) USER INTERFACE FOR DISPLAYING A GALLERY OF FORMATTING OPTIONS APPLICABLE TO A SELECTED OBJECT

(75) Inventors: Andrew M. Himberger, Woodinville, WA (US); Tracey M. Gauthier, Kirkland, WA (US); Aaron M. Butcher, Duvall, WA (US); Jensen M. Harris, Kirkland, WA (US); Jesse Clay Satterfield, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 383 days.

(21) Appl. No.: 10/955,942

(22) Filed: Sep. 30, 2004

(65) Prior Publication Data
US 2006/0036950 A1 Feb. 16, 2006

Related U.S. Application Data

(60) Provisional application No. 60/601,815, filed on Aug. 16, 2004.

(51) Int. Cl.
*G06F 3/048* (2006.01)
*G06G 3/033* (2006.01)

(52) U.S. Cl. ........ 715/825; 715/802; 715/828; 715/841; 715/842; 715/843; 715/845; 345/157

(58) Field of Classification Search .............. 715/783, 715/779, 802, 825, 841–843, 838; 345/157
See application file for complete search history.

(56) References Cited

U.S. PATENT DOCUMENTS

| | | | |
|---|---|---|---|
| 4,823,283 A | 4/1989 | Diehm et al. | 715/825 |
| 5,155,806 A | 10/1992 | Hoeber et al. | 715/711 |
| 5,220,675 A | 6/1993 | Padawer et al. | |
| 5,247,438 A | 9/1993 | Subas et al. | 700/90 |
| 5,323,314 A | 6/1994 | Baber et al. | 705/8 |
| 5,377,354 A | 12/1994 | Scannell et al. | 718/103 |
| 5,412,772 A | 5/1995 | Monson | |
| 5,461,708 A | 10/1995 | Kahn | |
| 5,500,936 A | 3/1996 | Allen et al. | |
| 5,519,606 A | 5/1996 | Frid-Nielsen et al. | 705/9 |
| 5,559,875 A | 9/1996 | Bieselin et al. | 379/202.01 |
| 5,559,944 A | 9/1996 | Ono | 715/841 |
| 5,570,109 A | 10/1996 | Jenson | 715/823 |
| 5,581,677 A | 12/1996 | Myers et al. | |
| 5,588,107 A | 12/1996 | Bowden et al. | 715/828 |
| 5,592,602 A | 1/1997 | Edmunds | |

(Continued)

FOREIGN PATENT DOCUMENTS

EP    1 077 405 A2    2/2001

(Continued)

OTHER PUBLICATIONS

Screendumps (Microsoft Corporation, Microsoft Office Professional Edition 2003; 5 pages).*

(Continued)

*Primary Examiner* — Dennis-Doon Chow
*Assistant Examiner* — Linh K Pham
(74) *Attorney, Agent, or Firm* — Merchant & Gould

(57) ABSTRACT

An improved user interface is provided for displaying a gallery of images showing different formatting options combinations that may be applied to a selected object. When a particular image is selected an associated formatting options combination is automatically applied to the selected object.

30 Claims, 12 Drawing Sheets

U.S. PATENT DOCUMENTS

| | | | | |
|---|---|---|---|---|
| 5,625,783 | A | 4/1997 | Ezekiel et al. | 395/352 |
| 5,634,100 | A | 5/1997 | Capps | 705/9 |
| 5,634,128 | A | 5/1997 | Messina | 710/200 |
| 5,644,737 | A | 7/1997 | Tuniman et al. | 715/810 |
| 5,659,693 | A | 8/1997 | Hansen et al. | 715/779 |
| 5,673,403 | A | 9/1997 | Brown et al. | 715/744 |
| 5,721,847 | A | 2/1998 | Johnson | 395/333 |
| 5,734,915 | A | 3/1998 | Roewer | 395/773 |
| 5,760,768 | A | 6/1998 | Gram | 345/333 |
| 5,760,773 | A | 6/1998 | Berman et al. | 715/808 |
| 5,761,646 | A | 6/1998 | Frid-Nielsen et al. | 705/9 |
| 5,778,404 | A | 7/1998 | Capps et al. | 715/531 |
| 5,787,295 | A | 7/1998 | Nakao | 715/210 |
| 5,793,365 | A | 8/1998 | Tang et al. | 715/758 |
| 5,805,167 | A | 9/1998 | Van Cruyningen | 715/808 |
| 5,812,132 | A | 9/1998 | Goldstein | 715/797 |
| 5,821,936 | A | 10/1998 | Shaffer et al. | 715/810 |
| 5,828,376 | A * | 10/1998 | Solimene et al. | 715/821 |
| 5,838,321 | A | 11/1998 | Wolf | 345/343 |
| 5,842,009 | A | 11/1998 | Borovoy et al. | 707/1 |
| 5,844,558 | A * | 12/1998 | Kumar et al. | 345/440.2 |
| 5,844,572 | A | 12/1998 | Schott | 345/434 |
| 5,855,006 | A | 12/1998 | Huemoeller et al. | 705/9 |
| 5,872,973 | A | 2/1999 | Mitchell et al. | |
| 5,873,108 | A | 2/1999 | Goyal et al. | 715/203 |
| 5,885,006 | A | 3/1999 | Sheedy | 384/192 |
| 5,893,073 | A | 4/1999 | Kasso et al. | 705/8 |
| 5,893,125 | A | 4/1999 | Shostak | 715/206 |
| 5,898,436 | A | 4/1999 | Stewart et al. | 345/354 |
| 5,899,979 | A | 5/1999 | Miller et al. | 705/9 |
| 5,905,863 | A | 5/1999 | Knowles et al. | 709/206 |
| 5,926,806 | A | 7/1999 | Marshall et al. | 707/3 |
| 5,936,625 | A | 8/1999 | Kahl et al. | 715/775 |
| 5,937,160 | A | 8/1999 | Davis et al. | 709/203 |
| 5,940,078 | A | 8/1999 | Nagarajayya et al. | 345/346 |
| 5,943,051 | A | 8/1999 | Onda et al. | 715/786 |
| 5,960,406 | A | 9/1999 | Rasansky et al. | 705/9 |
| 5,970,466 | A | 10/1999 | Detjen et al. | 705/8 |
| 5,999,173 | A | 12/1999 | Ubillos | |
| 5,999,938 | A | 12/1999 | Bliss et al. | 707/102 |
| 6,008,806 | A | 12/1999 | Nakajima et al. | 345/335 |
| 6,016,478 | A | 1/2000 | Zhang et al. | 705/9 |
| 6,018,343 | A | 1/2000 | Wang et al. | 345/356 |
| 6,034,683 | A | 3/2000 | Mansour et al. | 715/764 |
| 6,038,395 | A | 3/2000 | Chow et al. | |
| 6,038,542 | A | 3/2000 | Ruckdashel | 705/9 |
| 6,067,087 | A | 5/2000 | Krauss et al. | 715/762 |
| 6,067,551 | A | 5/2000 | Brown et al. | 1/1 |
| 6,072,492 | A | 6/2000 | Schagen et al. | 715/733 |
| 6,073,142 | A | 6/2000 | Geiger et al. | |
| 6,101,480 | A | 8/2000 | Conmy et al. | 705/9 |
| 6,133,915 | A | 10/2000 | Arcuri et al. | 715/779 |
| 6,175,363 | B1 | 1/2001 | Williams et al. | 345/334 |
| 6,188,403 | B1 | 2/2001 | Sacerdoti et al. | 715/764 |
| 6,195,094 | B1 | 2/2001 | Celebiler | 715/764 |
| 6,199,102 | B1 | 3/2001 | Cobb | |
| 6,222,540 | B1 | 4/2001 | Sacerdoti | 345/440 |
| 6,236,396 | B1 | 5/2001 | Jenson et al. | 715/764 |
| 6,237,135 | B1 | 5/2001 | Timbol | |
| 6,256,628 | B1 | 7/2001 | Dobson et al. | 707/6 |
| 6,269,341 | B1 | 7/2001 | Redcay, Jr. | 705/8 |
| 6,278,450 | B1 | 8/2001 | Arcuri et al. | 345/334 |
| 6,289,317 | B1 | 9/2001 | Peterson | 705/7 |
| 6,307,544 | B1 | 10/2001 | Harding | 715/709 |
| 6,307,574 | B1 | 10/2001 | Ashe | |
| 6,323,883 | B1 | 11/2001 | Minoura et al. | 715/784 |
| 6,326,962 | B1 | 12/2001 | Szabo | 715/762 |
| 6,327,046 | B1 | 12/2001 | Miyamoto et al. | 358/1.15 |
| 6,341,277 | B1 | 1/2002 | Coden et al. | 707/718 |
| 6,359,634 | B1 | 3/2002 | Cragun et al. | 715/777 |
| 6,373,507 | B1 | 4/2002 | Camara et al. | |
| 6,384,849 | B1 * | 5/2002 | Morcos et al. | 715/810 |
| 6,385,769 | B1 | 5/2002 | Lewallen | |
| 6,424,829 | B1 | 7/2002 | Kraft | 455/412.1 |
| 6,429,882 | B1 | 8/2002 | Abdelnur et al. | 345/763 |
| 6,430,563 | B1 | 8/2002 | Fritz et al. | 707/694 |
| 6,433,801 | B1 | 8/2002 | Moon et al. | 345/840 |
| 6,433,831 | B1 | 8/2002 | Dinwiddie et al. | 348/553 |
| 6,434,598 | B1 | 8/2002 | Gish | 709/203 |
| 6,442,527 | B1 | 8/2002 | Worthington | 705/8 |
| 6,456,304 | B1 | 9/2002 | Angiulo et al. | |
| 6,457,062 | B1 | 9/2002 | Pivowar et al. | 709/248 |
| 6,459,441 | B1 | 10/2002 | Perroux et al. | 345/837 |
| 6,466,236 | B1 | 10/2002 | Pivowar et al. | 715/835 |
| 6,469,722 | B1 | 10/2002 | Kinoe et al. | |
| 6,469,723 | B1 | 10/2002 | Gould | |
| 6,480,865 | B1 | 11/2002 | Lee et al. | 715/523 |
| 6,484,180 | B1 | 11/2002 | Lyons et al. | 1/1 |
| 6,493,006 | B1 | 12/2002 | Gourdol et al. | 715/825 |
| 6,507,845 | B1 | 1/2003 | Cohen et al. | 707/608 |
| 6,546,417 | B1 | 4/2003 | Baker | 709/206 |
| 6,570,596 | B2 | 5/2003 | Frederiksen | 715/808 |
| 6,578,192 | B1 | 6/2003 | Boehme et al. | 717/115 |
| 6,618,732 | B1 | 9/2003 | White et al. | 707/103 |
| 6,621,504 | B1 | 9/2003 | Nadas et al. | 715/723 |
| 6,621,508 | B1 | 9/2003 | Shiraishi et al. | 715/810 |
| 6,635,089 | B1 | 10/2003 | Burkett et al. | 715/513 |
| 6,664,983 | B2 | 12/2003 | Ludolph | 715/775 |
| 6,680,749 | B1 | 1/2004 | Anderson et al. | 348/231.99 |
| 6,686,938 | B1 | 2/2004 | Jobs et al. | 345/835 |
| 6,691,281 | B1 | 2/2004 | Sorge et al. | 715/503 |
| 6,701,513 | B1 | 3/2004 | Bailey | |
| 6,708,205 | B2 | 3/2004 | Sheldon et al. | 709/206 |
| 6,721,402 | B2 | 4/2004 | Usami | |
| 6,727,919 | B1 | 4/2004 | Reder et al. | 715/810 |
| 6,732,330 | B1 | 5/2004 | Claussen et al. | 715/513 |
| 6,734,880 | B2 | 5/2004 | Chang et al. | 715/738 |
| 6,750,890 | B1 * | 6/2004 | Sugimoto | 715/838 |
| 6,785,868 | B1 | 8/2004 | Raff | 715/530 |
| 6,789,107 | B1 | 9/2004 | Bates et al. | |
| 6,826,729 | B1 | 11/2004 | Giesen et al. | 715/837 |
| 6,850,255 | B2 | 2/2005 | Muschetto | 715/788 |
| 6,871,195 | B2 | 3/2005 | Ryan et al. | 706/46 |
| 6,882,354 | B1 | 4/2005 | Nielson | 715/784 |
| 6,895,426 | B1 | 5/2005 | Cortright et al. | |
| 6,904,449 | B1 | 6/2005 | Quinones | 709/203 |
| 6,906,717 | B2 | 6/2005 | Couckuyt et al. | 345/440 |
| 6,915,492 | B2 | 7/2005 | Kurtenbach et al. | 715/810 |
| 6,924,797 | B1 | 8/2005 | MacPhail | 345/326 |
| 6,925,605 | B2 | 8/2005 | Bates et al. | 709/206 |
| 6,928,613 | B1 | 8/2005 | Ishii | |
| 6,941,304 | B2 | 9/2005 | Gainey et al. | |
| 6,964,025 | B2 * | 11/2005 | Angiulo et al. | 715/838 |
| 6,983,889 | B2 | 1/2006 | Alles | 236/49.1 |
| 6,988,241 | B1 | 1/2006 | Guttman et al. | 715/503 |
| 6,990,637 | B2 * | 1/2006 | Anthony et al. | 715/851 |
| 6,990,652 | B1 | 1/2006 | Parthasarathy et al. | |
| 7,027,463 | B2 | 4/2006 | Mathew et al. | |
| 7,032,210 | B2 | 4/2006 | Alloing et al. | 717/106 |
| 7,039,596 | B1 | 5/2006 | Lu | 705/8 |
| 7,046,848 | B1 * | 5/2006 | Olcott | 382/176 |
| 7,069,538 | B1 | 6/2006 | Renshaw | |
| 7,107,544 | B1 | 9/2006 | Luke | 715/752 |
| 7,110,936 | B2 | 9/2006 | Hiew et al. | 703/22 |
| 7,111,238 | B1 | 9/2006 | Kuppusamy et al. | |
| 7,117,370 | B2 | 10/2006 | Khan et al. | 713/186 |
| 7,149,983 | B1 | 12/2006 | Robertson et al. | 715/810 |
| 7,152,207 | B1 | 12/2006 | Underwood et al. | 715/526 |
| 7,181,697 | B2 | 2/2007 | Tai et al. | 715/779 |
| 7,188,073 | B1 | 3/2007 | Tam et al. | 705/9 |
| 7,188,317 | B1 | 3/2007 | Hazel | 715/804 |
| 7,206,813 | B2 | 4/2007 | Dunbar et al. | |
| 7,206,814 | B2 | 4/2007 | Kirsch | |
| 7,212,208 | B2 | 5/2007 | Khozai | 345/440 |
| 7,216,301 | B2 | 5/2007 | Moehrle | 715/811 |
| 7,219,305 | B2 | 5/2007 | Jennings | 715/761 |
| 7,240,323 | B1 | 7/2007 | Desai et al. | 717/100 |
| 7,249,325 | B1 | 7/2007 | Donaldson | 715/777 |
| 7,263,668 | B1 | 8/2007 | Lentz | 715/801 |
| 7,290,033 | B1 | 10/2007 | Goldman et al. | 709/206 |
| 7,296,241 | B2 | 11/2007 | Oshiro et al. | |
| 7,325,204 | B2 | 1/2008 | Rogers | 715/792 |
| 7,328,409 | B2 | 2/2008 | Awada et al. | 715/765 |
| 7,346,705 | B2 | 3/2008 | Hullot et al. | 709/238 |
| 7,356,772 | B2 | 4/2008 | Brownholtz et al. | 715/752 |
| 7,386,535 | B1 | 6/2008 | Kalucha et al. | |
| 7,386,835 | B1 | 6/2008 | Desai et al. | 717/117 |

| | | |
|---|---|---|
| 7,392,249 B1 | 6/2008 | Harris et al. |
| 7,395,221 B2 | 7/2008 | Doss et al. .................... 705/9 |
| 7,395,500 B2 | 7/2008 | Whittle et al. |
| 7,421,660 B2 | 9/2008 | Charmock et al. ............ 715/751 |
| 7,421,690 B2 | 9/2008 | Forstall et al. ................ 709/206 |
| 7,469,385 B2 | 12/2008 | Harper et al. |
| 7,472,117 B2 | 12/2008 | Dettinger et al. .................. 1/1 |
| 7,499,907 B2 | 3/2009 | Brown et al. ...................... 1/1 |
| 7,555,707 B1 | 6/2009 | Labarge et al. ............... 715/234 |
| 7,627,561 B2 | 12/2009 | Pell et al. ........................ 707/3 |
| 7,664,821 B1 | 2/2010 | Ancin et al. .................. 709/206 |
| 7,703,036 B2 | 4/2010 | Satterfield et al. ............ 715/777 |
| 7,707,255 B2 | 4/2010 | Satterfield et al. ............ 709/206 |
| 7,711,742 B2 | 5/2010 | Bennett et al. ................ 707/759 |
| 7,716,593 B2 | 5/2010 | Durazo et al. ................. 715/752 |
| 7,739,259 B2 | 6/2010 | Hartwell et al. ............... 707/706 |
| 7,747,966 B2 | 6/2010 | Leukart et al. ................ 715/792 |
| 7,788,598 B2 | 8/2010 | Bansal et al. .................. 715/810 |
| 7,802,199 B2 | 9/2010 | Shneerson et al. |
| 7,831,902 B2 | 11/2010 | Sourov et al. ................. 715/220 |
| 7,853,877 B2 | 12/2010 | Giesen et al. .................. 715/711 |
| 7,865,868 B2 | 1/2011 | Falzone Schaw et al. |
| 7,870,465 B2 | 1/2011 | VerSteeg ....................... 714/774 |
| 7,886,290 B2 | 2/2011 | Dhanjal et al. ................ 717/170 |
| 7,895,531 B2 | 2/2011 | Radtke et al. .................. 715/810 |
| 2001/0032220 A1 | 10/2001 | Ven Hoff ....................... 707/513 |
| 2001/0035882 A1 | 11/2001 | Stoakley et al. ............... 715/779 |
| 2001/0049677 A1 | 12/2001 | Talib et al. ........................ 707/3 |
| 2002/0007380 A1 | 1/2002 | Bauchot et al. ................ 707/530 |
| 2002/0029247 A1 | 3/2002 | Kawamoto ..................... 709/206 |
| 2002/0037754 A1 | 3/2002 | Hama et al. .................... 455/566 |
| 2002/0052880 A1 | 5/2002 | Fruensgaard et al. ...... 707/104.1 |
| 2002/0070977 A1 | 6/2002 | Morcos et al. ................. 345/810 |
| 2002/0075330 A1 | 6/2002 | Rosenzweig et al. ......... 345/854 |
| 2002/0078143 A1 | 6/2002 | De Boor et al. |
| 2002/0083054 A1 | 6/2002 | Peltonen et al. .................. 707/5 |
| 2002/0091697 A1 | 7/2002 | Huang et al. .................... 707/10 |
| 2002/0091739 A1 | 7/2002 | Ferlitsch et al. ............... 707/526 |
| 2002/0122071 A1 | 9/2002 | Camara et al. |
| 2002/0133557 A1 | 9/2002 | Winarski ........................ 709/207 |
| 2002/0135621 A1 | 9/2002 | Angiulo et al. ................ 345/838 |
| 2002/0140731 A1 | 10/2002 | Subramaniam et al. ....... 345/762 |
| 2002/0140740 A1 | 10/2002 | Chen |
| 2002/0149623 A1 | 10/2002 | West et al. ..................... 345/765 |
| 2002/0149629 A1 | 10/2002 | Craycroft et al. .............. 345/861 |
| 2002/0154178 A1 | 10/2002 | Barnett et al. .................. 715/853 |
| 2002/0158876 A1 | 10/2002 | Janssen .......................... 345/504 |
| 2002/0163538 A1 | 11/2002 | Shteyn .......................... 345/752 |
| 2002/0175938 A1 | 11/2002 | Hackworth .................... 345/751 |
| 2002/0175955 A1 | 11/2002 | Gourdol et al. ................ 345/821 |
| 2002/0186257 A1 | 12/2002 | Cadiz et al. .................... 715/764 |
| 2002/0196293 A1 | 12/2002 | Suppan et al. ................. 345/853 |
| 2003/0009455 A1 | 1/2003 | Carlson et al. .................... 707/6 |
| 2003/0011638 A1 | 1/2003 | Chung ........................... 345/808 |
| 2003/0011639 A1 | 1/2003 | Webb ............................. 715/808 |
| 2003/0014421 A1 | 1/2003 | Jung .............................. 707/102 |
| 2003/0014490 A1 | 1/2003 | Bates et al. .................... 709/206 |
| 2003/0022700 A1 | 1/2003 | Wang ............................. 455/566 |
| 2003/0025732 A1 | 2/2003 | Prichard ........................ 345/765 |
| 2003/0035917 A1* | 2/2003 | Hyman ............................ 428/67 |
| 2003/0038832 A1 | 2/2003 | Sobol |
| 2003/0043200 A1 | 3/2003 | Faieta et al. .................... 345/804 |
| 2003/0043211 A1 | 3/2003 | Kremer et al. |
| 2003/0046528 A1 | 3/2003 | Haitani et al. ..................... 713/2 |
| 2003/0066025 A1 | 4/2003 | Garner et al. .................. 715/500 |
| 2003/0070143 A1 | 4/2003 | Maslov .......................... 715/513 |
| 2003/0084035 A1 | 5/2003 | Emerick ............................ 707/3 |
| 2003/0093490 A1 | 5/2003 | Yamamoto et al. ............ 709/213 |
| 2003/0097361 A1 | 5/2003 | Huang et al. .................... 707/10 |
| 2003/0097640 A1 | 5/2003 | Abrams et al. ................. 715/530 |
| 2003/0106024 A1 | 6/2003 | Silverbrook et al. .......... 715/515 |
| 2003/0110191 A1 | 6/2003 | Handsaker et al. ............ 707/503 |
| 2003/0112278 A1* | 6/2003 | Driskell ......................... 345/788 |
| 2003/0135825 A1 | 7/2003 | Gertner et al. ................. 715/513 |
| 2003/0156140 A1 | 8/2003 | Watanabe ....................... 345/810 |
| 2003/0160821 A1 | 8/2003 | Yoon ............................. 345/762 |
| 2003/0163537 A1 | 8/2003 | Rohall et al. ................... 709/206 |
| 2003/0167310 A1 | 9/2003 | Moody et al. .................. 709/206 |
| 2003/0195937 A1 | 10/2003 | Kircher et al. ................. 709/207 |
| 2003/0206646 A1 | 11/2003 | Brackett |
| 2003/0218611 A1 | 11/2003 | Ben-Tovim et al. ........... 345/440 |
| 2003/0226106 A1 | 12/2003 | McKellar et al. .............. 715/513 |
| 2003/0233419 A1 | 12/2003 | Beringer ........................ 709/206 |
| 2004/0006570 A1 | 1/2004 | Gelb et al. ..................... 707/102 |
| 2004/0012633 A1 | 1/2004 | Helt |
| 2004/0030993 A1 | 2/2004 | Hong Huey et al. |
| 2004/0056894 A1 | 3/2004 | Zaika et al. .................... 345/762 |
| 2004/0083432 A1 | 4/2004 | Kawamura et al. ............ 715/526 |
| 2004/0088359 A1 | 5/2004 | Simpson |
| 2004/0090315 A1* | 5/2004 | Mackjust et al. ......... 340/426.13 |
| 2004/0100504 A1 | 5/2004 | Sommer ........................ 345/810 |
| 2004/0100505 A1 | 5/2004 | Cazier ........................... 345/811 |
| 2004/0109025 A1 | 6/2004 | Hullot et al. ................... 715/764 |
| 2004/0109033 A1 | 6/2004 | Vienneau et al. .............. 345/863 |
| 2004/0117451 A1 | 6/2004 | Chung ........................... 709/207 |
| 2004/0122789 A1 | 6/2004 | Ostertag et al. |
| 2004/0125142 A1 | 7/2004 | Mock et al. .................... 345/765 |
| 2004/0128275 A1 | 7/2004 | Moehrle ........................... 707/1 |
| 2004/0133854 A1 | 7/2004 | Black ............................ 715/517 |
| 2004/0142720 A1 | 7/2004 | Smethers .................... 455/550.1 |
| 2004/0153968 A1 | 8/2004 | Ching et al. ................... 715/513 |
| 2004/0164983 A1 | 8/2004 | Khozai .......................... 345/440 |
| 2004/0168153 A1 | 8/2004 | Marvin .......................... 717/120 |
| 2004/0186775 A1 | 9/2004 | Margiloff et al. ................. 705/14 |
| 2004/0189694 A1 | 9/2004 | Kurtz et al. |
| 2004/0192440 A1 | 9/2004 | Evans et al. |
| 2004/0215612 A1 | 10/2004 | Brody ............................. 707/3 |
| 2004/0230508 A1 | 11/2004 | Minnis et al. ..................... 705/35 |
| 2004/0230906 A1 | 11/2004 | Pik et al. ....................... 715/522 |
| 2004/0260756 A1 | 12/2004 | Forstall et al. |
| 2004/0261013 A1 | 12/2004 | Wynn et al. ................... 715/511 |
| 2004/0268231 A1 | 12/2004 | Tunning ......................... 715/513 |
| 2004/0268270 A1 | 12/2004 | Hill et al. ....................... 715/963 |
| 2005/0004989 A1 | 1/2005 | Satterfield et al. ............. 709/206 |
| 2005/0005235 A1 | 1/2005 | Satterfield et al. ............. 715/519 |
| 2005/0005249 A1 | 1/2005 | Hill et al. ....................... 715/963 |
| 2005/0010871 A1 | 1/2005 | Ruthfield et al. ............... 715/712 |
| 2005/0021504 A1 | 1/2005 | Atchison .......................... 707/3 |
| 2005/0022116 A1 | 1/2005 | Bowman et al. ............... 715/513 |
| 2005/0033614 A1 | 2/2005 | Lettovsky et al. ................ 705/5 |
| 2005/0039142 A1 | 2/2005 | Jalon et al. ..................... 715/823 |
| 2005/0043015 A1 | 2/2005 | Muramatsu ................ 455/412.1 |
| 2005/0044500 A1 | 2/2005 | Orimoto et al. ................ 715/706 |
| 2005/0055449 A1 | 3/2005 | Rappold, III ................... 709/228 |
| 2005/0057584 A1 | 3/2005 | Gruen et al. ................... 345/752 |
| 2005/0086135 A1 | 4/2005 | Lu .................................... 705/30 |
| 2005/0091576 A1 | 4/2005 | Relyea et al. |
| 2005/0097465 A1 | 5/2005 | Giesen et al. .................. 715/700 |
| 2005/0114778 A1 | 5/2005 | Branson et al. ................ 715/711 |
| 2005/0117179 A1 | 6/2005 | Ito et al. ....................... 358/1.15 |
| 2005/0132010 A1 | 6/2005 | Muller |
| 2005/0132053 A1 | 6/2005 | Roth et al. ..................... 709/227 |
| 2005/0138576 A1* | 6/2005 | Baumert et al. ................ 715/862 |
| 2005/0144241 A1 | 6/2005 | Stata et al. |
| 2005/0144284 A1 | 6/2005 | Ludwig et al. ................. 709/226 |
| 2005/0144568 A1 | 6/2005 | Gruen et al. ................... 715/822 |
| 2005/0172262 A1 | 8/2005 | Lalwani ......................... 717/109 |
| 2005/0177789 A1 | 8/2005 | Abbar et al. ................... 705/528 |
| 2005/0183008 A1 | 8/2005 | Crider et al. ................... 715/517 |
| 2005/0203975 A1 | 9/2005 | Jindal et al. .................... 707/204 |
| 2005/0223066 A1 | 10/2005 | Buchheit et al. |
| 2005/0223329 A1* | 10/2005 | Schwartz et al. .............. 715/711 |
| 2005/0234910 A1 | 10/2005 | Buchheit et al. |
| 2005/0251757 A1 | 11/2005 | Farn |
| 2005/0278656 A1* | 12/2005 | Goldthwaite et al. ......... 715/810 |
| 2005/0289109 A1 | 12/2005 | Arrouye et al. ................... 707/1 |
| 2005/0289158 A1 | 12/2005 | Weiss et al. .................... 707/100 |
| 2006/0015816 A1 | 1/2006 | Kuehner et al. ................ 715/744 |
| 2006/0026033 A1 | 2/2006 | Brydon et al. ..................... 705/1 |
| 2006/0026213 A1 | 2/2006 | Yaskin et al. ................... 707/200 |
| 2006/0026242 A1 | 2/2006 | Kuhlmann et al. |
| 2006/0036580 A1 | 2/2006 | Stata ................................ 707/3 |
| 2006/0036945 A1 | 2/2006 | Radtke et al. .................. 715/708 |
| 2006/0036946 A1 | 2/2006 | Radtke et al. .................. 715/711 |
| 2006/0036964 A1 | 2/2006 | Satterfield et al. ............. 715/777 |
| 2006/0036965 A1 | 2/2006 | Harris et al. ................... 715/777 |
| 2006/0306945 | 2/2006 | Radtke et al. .................. 715/708 |
| 2006/0047644 A1 | 3/2006 | Bocking et al. |

| | | | |
|---|---|---|---|
| 2006/0064434 A1 | 3/2006 | Gilbert et al. | 707/104.1 |
| 2006/0069604 A1 | 3/2006 | Leukart et al. | 705/9 |
| 2006/0069686 A1 | 3/2006 | Beyda et al. | 707/10 |
| 2006/0080303 A1 | 4/2006 | Sargent et al. | 707/3 |
| 2006/0095865 A1 | 5/2006 | Rostom | 715/810 |
| 2006/0101051 A1 | 5/2006 | Carr et al. | 707/102 |
| 2006/0101350 A1 | 5/2006 | Scott | 715/779 |
| 2006/0111931 A1 | 5/2006 | Johnson et al. | 705/1 |
| 2006/0117302 A1 | 6/2006 | Mercer et al. | |
| 2006/0129937 A1* | 6/2006 | Shafron | 715/733 |
| 2006/0132812 A1 | 6/2006 | Barnes et al. | 358/1.11 |
| 2006/0155689 A1 | 7/2006 | Blakeley et al. | 707/3 |
| 2006/0161849 A1 | 7/2006 | Miller et al. | 715/744 |
| 2006/0161863 A1 | 7/2006 | Gallo | 715/810 |
| 2006/0168522 A1 | 7/2006 | Bala | |
| 2006/0173961 A1 | 8/2006 | Turski et al. | |
| 2006/0218500 A1 | 9/2006 | Sauve et al. | 715/767 |
| 2006/0242557 A1* | 10/2006 | Nortis, III | 715/509 |
| 2006/0242575 A1 | 10/2006 | Winser | 715/530 |
| 2006/0248012 A1 | 11/2006 | Kircher et al. | 705/50 |
| 2006/0259449 A1 | 11/2006 | Betz et al. | 707/1 |
| 2006/0271869 A1 | 11/2006 | Thanu et al. | 715/764 |
| 2006/0271910 A1 | 11/2006 | Burcham et al. | |
| 2006/0282817 A1 | 12/2006 | Darst et al. | |
| 2006/0294526 A1 | 12/2006 | Hambrick et al. | 719/315 |
| 2007/0006206 A1 | 1/2007 | Dhanjal et al. | 717/168 |
| 2007/0050182 A1 | 3/2007 | Sneddon et al. | 704/2 |
| 2007/0055936 A1 | 3/2007 | Dhanjal et al. | |
| 2007/0055943 A1 | 3/2007 | McCormack et al. | 715/746 |
| 2007/0061306 A1 | 3/2007 | Pell et al. | 707/3 |
| 2007/0061307 A1 | 3/2007 | Hartwell et al. | 707/3 |
| 2007/0061308 A1 | 3/2007 | Hartwell et al. | 707/3 |
| 2007/0061738 A1 | 3/2007 | Taboada et al. | |
| 2007/0106951 A1 | 5/2007 | McCormack et al. | 715/764 |
| 2007/0143662 A1 | 6/2007 | Carlson et al. | 715/507 |
| 2007/0180040 A1 | 8/2007 | Etgen et al. | 709/207 |
| 2007/0203991 A1 | 8/2007 | Fisher et al. | |
| 2007/0282956 A1 | 12/2007 | Staats | 709/206 |
| 2008/0005686 A1 | 1/2008 | Singh | |
| 2008/0040682 A1 | 2/2008 | Sorenson et al. | 715/777 |
| 2008/0052670 A1 | 2/2008 | Espinosa et al. | |
| 2008/0104505 A1 | 5/2008 | Keohane et al. | 715/246 |
| 2008/0109787 A1 | 5/2008 | Wang et al. | |
| 2008/0134138 A1 | 6/2008 | Chamieh et al. | 717/105 |
| 2008/0141242 A1 | 6/2008 | Shapiro | 717/174 |
| 2008/0155555 A1 | 6/2008 | Kwong | 719/315 |
| 2008/0178110 A1 | 7/2008 | Hill et al. | 715/771 |
| 2008/0244440 A1 | 10/2008 | Bailey | |
| 2009/0012984 A1 | 1/2009 | Ravid et al. | 707/101 |
| 2009/0100009 A1 | 4/2009 | Karp | |
| 2009/0106375 A1 | 4/2009 | Carmel et al. | 709/206 |
| 2009/0319619 A1 | 12/2009 | Affronti | |
| 2009/0319911 A1 | 12/2009 | Mccann et al. | |
| 2010/0060645 A1 | 3/2010 | Garg et al. | 345/440 |
| 2010/0180226 A1 | 7/2010 | Satterfield et al. | 715/777 |
| 2010/0191818 A1 | 7/2010 | Satterfield et al. | 709/206 |
| 2010/0211889 A1 | 8/2010 | Durazo et al. | 715/752 |
| 2010/0223575 A1 | 9/2010 | Leukart et al. | 715/779 |
| 2010/0293470 A1 | 11/2010 | Zhao et al. | |
| 2011/0072396 A1 | 3/2011 | Giesen et al. | 715/841 |
| 2011/0138273 A1 | 6/2011 | Radtke et al. | 715/256 |
| 2011/0296322 A1 | 12/2011 | Dhanjal et al. | 715/760 |

FOREIGN PATENT DOCUMENTS

| | | |
|---|---|---|
| EP | 1223503 | 7/2002 |
| EP | 1376337 | 2/2004 |
| EP | 1 462 999 A2 | 9/2004 |
| EP | 1 542 133 A2 | 6/2005 |
| GB | 2391148 | 1/2004 |
| ID | P 0027717 | 3/2011 |
| ID | P 0027754 | 3/2011 |
| JP | 05-204579 | 8/1993 |
| JP | 06-342357 | 12/1994 |
| JP | 10-074217 | 3/1998 |
| JP | 10-326171 | 12/1998 |
| JP | 11-175258 | 7/1999 |
| JP | 2001-503893 | 3/2001 |
| JP | 2001-337944 | 12/2001 |
| JP | 2003-101768 | 4/2003 |
| JP | 2003-256302 | 9/2003 |
| JP | 2004-078512 | 3/2004 |
| JP | 2004-102803 | 4/2004 |
| JP | 2004-512578 | 4/2004 |
| JP | 2004-145569 | 5/2004 |
| JP | 2004-342115 | 12/2004 |
| JP | 2005-182353 | 7/2005 |
| JP | 2005-236089 | 9/2011 |
| JP | 4832024 | 9/2011 |
| KR | 10-2005-0023805 A | 3/2005 |
| KR | 10-2005-0036702 A | 4/2005 |
| PH | 1-2005-000404 | 8/2011 |
| WO | WO 99/27495 | 6/1999 |
| WO | WO 01/55894 | 8/2001 |
| WO | WO 03/003240 A2 | 1/2003 |
| WO | WO 03/098500 | 11/2003 |
| WO | WO 2007/033159 A1 | 3/2007 |
| WO | WO 2007/027737 A1 | 8/2007 |
| WO | WO 2008/121718 A1 | 10/2008 |

OTHER PUBLICATIONS

Screendumps- Microsoft Office (Microsoft Corporation, Microsoft Office Professional Edition 2003; 10 pages).*
Screendumps- Microsoft Oñice Outlook (Microsoft Corporation, Microsoft Office Outlook Professional Edition 2003; 2 pages).*
Screendumps- Microsoft Office (Microsoft Corporation, Microsoft Office Professional Edition 2003; 13 pages).*
Screendumps- Microsoft Office (Microsoft Corporation, Microsoft Office Professional Edition 2003; 16 pages).*
Microsoft Office Professional Plus 2007, © 2006, Microsoft Corporation; 66 pages.*
Charles Rich, Candace L. Sidner, "Segmented Interaction History in a Collaborative Interface Agent," 1997 ACM, pp. 23-30.
Andrew Dwelly, "Functions and Dynamic User Interfaces," 1989 ACM, pp. 371-381.
Alias I. Wavefront, "The Hotbox: Efficient Access to a Large Number of Menu-items," ACM 1999, pp. 231-237.
Charles Rich, Candace L. Sidner, "Adding a Collaborative Agent to Graphical User Interfaces," 1996 ACM, pp. 21-30.
U.S: Official Action mailed Dec. 23, 2003 in U.S. Appl. No. 09/896,384.
U.S. Official Action mailed Aug. 24, 2004 in U.S. Appl. No. 09/896,384.
U.S. Appl. No. 10/982,073, filed Nov. 5, 2004, entitled "Gallery User Interface Controls".
U.S. Appl. No. 10/836,154, filed Apr. 30, 2004, entitled "Combined Content Selection and Display User Interface".
U.S. Appl. No. 10/848,774, filed May 19, 2004, entitled "Automatic Grouping of Electronic Mail".
Boyce, "Microsoft Outlook Inside Out," 2001, pp. 67, 68, 109, 110, 230, 231, 310, 316-318, 798.
Halvorson and Young, "Microsoft Office XP Inside Out," 2001, pp. 1005-1009, 1015, 1023-1028, 1036-1039, 1093.
Riggsby, McCoy, Haberman and Falciani, "Mastering Lotus Notes and Domino 6," 2003, pp. 135-139.
U.S. Appl. No. 10/851,442, filed May 21, 2004, entitled "Conversation Grouping of Electronic Mail Records".
Riggsby, McCoy, Haberman and Falciani, "Mastering Lotus Notes and Domino 6," 2003, pp. 135-138, 607-612.
U.S. Appl. No. 10/851,506, filed May 21, 2004, entitled "Adaptive Multi-Line View User Interface".
Examination Report, Jul. 25, 2005.
Search Report, Danish Patent and Trademark Office, Sep. 18, 2006.
Written Opinion, Danish Patent and Trademark Office, Sep. 18, 2006.
Search Report, Danish Patent and Trademark Office, Sep. 19, 2006.
U.S. Appl. No. 10/955,940, filed Sep. 30, 2004, entitled "User Interface for Displaying Selectable Software Functionality Controls that are Contextually Relevant to a Selected Object".
U.S. Appl. No. 10/955,967, filed Sep. 30, 2004, entitled "Command User Interface for Displaying Selectable Software Functionality Controls".
U.S. Appl. No. 10/955,928, filed Sep. 30, 2004, entitled "User Interface for Providing Task Management and Calendar Information".

U.S. Official Action mailed Apr. 27, 2006 in U.S. Appl. No. 10/800,056.
Amendment to Office Action of Apr. 27, 2006, dated Jul. 27, 2006 in U.S. Appl. No. 10/800,056.
U.S. Official Action mailed Oct. 19, 2006 in U.S. Appl. No. 10/800,056.
Amendment to Office Action of Oct. 19, 2006, dated Jan. 19, 2007 in U.S. Appl. No. 10/800,056.
U.S. Appl. No. 10/800,056, filed Mar. 12, 2004, entitled "Method and System for Data Binding in a Block Structured User Interface Scripting Language".
Khare and Rifkin, "The Origin of (Document) Species," University of California, 1998 (9 pages).
"Separate Structure and Presentation," http://www,webreference.com/html/tutorial5/1.html, Aug. 20, 1998 (4 pages).
"The Style Attribute and CSS Declarations," http://www.webreference.com/html/tutorial5/2, Aug. 20, 1998 (4 pages).
"What's Hot in Internet Services?," http://www.webreference.com/html/tutorial5/3, Aug. 20, 1998 (3 pages).
"The Style Element & CSS Selectors," http://www.webreference.com/html/tutorial5/4.html, Aug. 20, 1998 (e pages).
http://www/webreference.com/html/tutorial5/5.html, Aug. 20, 1998 (3 pages).
"ID & Class Selectors, Pseudoclasses," http://www.webreference.com/html/tutorial5/6.html, Aug. 20, 1998 (3 pages).
http://www.webreference.com/html/tutorial5/7.html, Aug. 20, 1998 (3 pages).
http://www.webreference.com/html/tutorial5/8.html, Aug. 20, 1998 (2 pages).
"External Style Sheets," http://www.webreference.com/html/tutoria5/10.html Aug. 20, 1998 (3 pages).
Raman, "Cascaded Speech Style Sheets," 1997 (9 pages).
"Primary Windows," http://www-03.ibm.com/servers/eserver/iseries/navigator/guidelines/primary.html, , (23 pages).
"User Interface Standards," http://msdn2.microsoftt.com/en-us/library/aa217660(office.11,d=printer).aspx, Sep. 2001 (5 pages).
"WebSphere Studio Overview," http://researchweb.watson.ibm.com/journal/sj/432/budinsky.html, May 6, 2004 (25 pages).
U.S. Official Action mailed Feb. 14, 2007 in U.S. Appl. No. 10/800,056.
U.S. Appl. No. 09/896,384, filed Jun. 29, 2001, entitled "Gallery User Interface Controls", Inventors: Koch et al.
U.S. Appl. No. not assigned, filed Nov. 5, 2004, entitled "Gallery User Interface Controls", Inventors: Koch et al.
Dwelly, A., "Functions and Dynamic User Interfaces," pp. 371-381 (1989).
Kurtenbach, G. et al., "The Hotbox: Efficient Access to a Large Number of Menu-items," CHI 99 15-20, pp. 231-237 (May 1999).
Rich, C. et al., "Adding a Collaborative Agent to Graphical User Interfaces," pp. 21-30 (1996).
Rich, C. et al., "Segmented Interaction History in a Collaborative Interface Agent," pp. 23-30 (1997).
U.S. Final Office Action dated Dec. 21, 2007 cited in U.S. Appl. No. 10/851,506.
U.S. Final Office Action dated Dec. 28, 2007 cited in U.S. Appl. No. 10/800,056.
U.S. Final Office Action dated Jan. 8, 2008 cited in U.S. Appl. No. 10/955,928.
U.S. Office Action dated Jan. 28, 2008 cited in U.S. Appl. No. 10/836,154.
U.S. Appl. No. 12/028,797, filed Feb. 9, 2008 entitled "Side-by-Side Shared Calendars".
U.S. Office Action dated Feb. 20, 2008 cited in U.S. Appl. No. 10/848,774.
U.S. Office Action dated Feb. 21, 2008 cited in U.S. Appl. No. 10/851,442.
Marshall School of Business, Workshop 1—Introduction to Outlook & E-mail, Apr. 6, 2000, pp. 1-11.
Jane Dorothy Calabria Burke, Ten Minute Guide to Lotus Notes 4.6, Publication date: Dec. 23, 1997, 2 pgs.
Bill Dyszel, Microsoft Outlook 2000 for Windows for Dummies, Copyright 1999, pp. 82-86, 102-103, 141,143.
Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.
U.S. Appl. No. 11/154,278, filed Jun. 16, 2005 entitled "Cross Version and Cross Product User Interface Compatibility".
U.S. Appl. No. 11/151,686, filed Jun. 13, 2005 entitled "Floating Command Object".
U.S. Appl. No. 11/401,470, filed Apr. 10, 2006 entitled "Command User Interface for Displaying Selectable Functionality Controls in a Database Application".
U.S. Appl. No. 10/607,020, filed Jun. 26, 2003 entitled "Side-by-Side Shared Calendars".
U.S. Appl. No. 10/741,407, filed Dec. 19, 2003 entitled "Methods, Systems, and Computer-Readable Mediums for Providing Persisting and Continuously Updating Search Folders".
U.S. Appl. No. 11/782,059, filed Jul. 24, 2007 entitled "Methods, Systems, and Computer-Readable Mediums for Providing Persisting and Continuously Updating Search Folders".
U.S. Appl. No. 10/851,506, filed May 21, 2004 entitled "Adaptive Multi-Line View User Interface".
U.S. Appl. No. 10/955,941, filed Sep. 30, 2004 entitled "An Improved User Interface for Displaying Selectable Software Functionality Controls that are Relevant to a Selected Object".
Gordon Padwick, Using Microsoft Outlook 2000, Que, Sp. Ed., May 1999.
Becker et al., "Virtual Folders: Database Support for Electronic Messages Classification," Pontificia Universidade Catolica do Rio Grande do Sul, Porto Alegre, Brazil, pp. 163-170.
Goldberg et al., "Using Collaborative Filtering to Weave an Information Tapestry," Communication of the ACM, vol. 35, No. 12, pp. 61-70, Dec. 1992.
Liu et al., "Continual Queries for Internet Scale Event-Driven Information Delivery," IEEE Transactions on Knowledge and Data Engineering, vol. 11, Issue 1, pp. 610-628, 1999.
Chen et al., "NiagaraCQ: A Scalable Continuous Query System for Internet Databases," Int. Conf. On Management of Data, Proc. Of the 2000 ACM SIGMOD Int. Conf. On Management of Data, pp. 379-390, 2000.
Marshall School of Business: "Workshop IV—Calendar," http://www.marshall.usc.edu/computing/PDF_Files/Outlook/Workshop4, PDF, Apr. 10, 2000, pp. 1-4.
M. Williams, "Programming Windows NT4: Unleashed," Sams Publishing, Indianapolis, 1996, pp. index & 167-185.
"Microsoft Outlook 2000: Introduction to Calendar," Version 2002.03.25, http://www.uakron.edu/its/learning/training/docs/Calendar032502.pdf, Mar. 25, 2002, pp. 1-52 .
Screen Dumps of Microsoft Outlook (1999, pp. 1-3).
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.
Microsoft Windows XP Professional, Version 2002, Service pack 2, 3 pgs.
Camarda, Using Microsoft Word 97, copyright 1997, QUE Corporation, pp. 412, 968.
NZ Application No. 541300, Examination Report dated Jul. 25, 2005.
Australian Search Report dated Jan. 16, 2007 cited in Singapore Application No. 200504474-8.
PCT Search Report dated Feb. 26, 2007 cited in International Application No. PCT/US2006/034993.
European Communicated dated Oct. 20, 2005 cited in EP Application No. 04102463.0-2211 PCT/.
Australian Written Opinion/Search Report cited in Singapore Application No. 200505257-6 mailed Feb. 12, 2007.
U.S. Office Action dated Apr. 12, 2007 cited in U.S. Appl. No. 10/851,506.

U.S. Office Action dated Jun. 4, 2007 cited in U.S. Appl. No. 10/955,940.
U.S. Office Action dated Jul. 26, 2006 cited in U.S. Appl. No. 10/741,407.
U.S. Final Office Action dated Jan. 23, 2007 cited in U.S. Appl. No. 10/741,407.
U.S. Notice of Allowance dated Apr. 10, 2007 cited in U.S. Appl. No. 10/741,407.
U.S. Office Action dated Jan. 4, 2007 cited in U.S. Appl. No. 10/607,020.
U.S. Office Action dated Jun. 14, 2007 cited in U.S. Appl. No. 10/836,154.
U.S. Office Action dated Jun. 21, 2007 cited in U.S. Appl. No. 10/955,928.
U.S. Notice of Allowance dated Jul. 5, 2007 cited in U.S. Appl. No. 10/607,020.
U.S. Office Action dated Jul. 11, 2007 cited in U.S. Appl. No. 10/955,941.
U.S. Office Action dated Jul. 11, 2007 cited in U.S. Appl. No. 10/955,967.
U.S. Office Action dated Sep. 26, 2007 cited in U.S. Appl. No. 11/151,686.
U.S. Office Action dated Oct. 9, 2007 cited in U.S. Appl. No. 10/982,073.
U.S. Office Action dated Jul. 13, 2007 cited in U.S. Appl. No. 10/800,056.
U.S. Final Office Action dated Dec. 4, 2007 cited in U.S. Appl. No. 10/955,940.
U.S. Final Office Action dated Apr. 16, 2008 cited in U.S. Appl. No. 10/955,967.
Screendumps Microsoft Corporation, Microsoft Office Professional Edition 2003, 4 pgs.
U.S. Final Office Action dated May 28, 2008 cited in U.S. Appl. No. 10/982,073.
Chinese Official Action dated Mar. 21, 2008 cited in Chinese Application No. 200510092146.4.
Chinese Official Action dated Mar. 21, 2008 cited in Chinese Application No. 200510092139.4.
Philippine Official Action dated Apr. 21, 2008 cited in Philippine Application No. 1-2005-000405.
Philippine Official Action dated Apr. 21, 2008 cited in Philippine Application No. 1-2005-000406.
U.S. Final Office Action dated Apr. 29, 2008 cited in U.S. Appl. No. 10/955,941.
Habraken, Microsoft Office XP 8 in 1, published Jun. 5, 2001, http://proquest.safaribooksonline.com/0789725096/, 12 pgs.
Word 2002, Chapter 14; Paradigm Publishing Inc., copyright 2002; http://www.emcp.com/tech_tutorials/sig_irc/Signature_Word_Chapter_14.ppt, 21 pgs.
Chilean Office Action dated Mar. 28, 2008 cited in Application No. 1770-05, no English Translation.
Chinese First Office Action dated Apr. 11, 2008 cited in Application No. 200510092141.1.
U.S. Final Office Action dated Jul. 24, 2008 cited in U.S. Appl. No. 11/151,686.
Microsoft Office Word 2003. Part of Microsoft Office Professional Edition 2003. Copyright 1983-2003 Microsoft Corporation.
Philippines Examiner's Action dated Aug. 19, 2008 cited in Application No. 1-2005-000405.
Chinese Second Office Action dated Oct. 10, 2008 cited in Application No. 200510092141.1.
Chinese Second Office Action dated Oct. 17, 2008 cited in Application No. 200510092139.4.
U.S. Final Office Action dated Oct. 28, 2008 cited in U.S. Appl. No. 11/151,686.
Philippine Official Action dated Jul. 31, 2008 cited in Philippine Application No. 12005000495.
European Communication dated Jun. 23, 2008 cited in European Application No. 04102463.9-2211/1517239.
Chinese First Office Action dated Apr. 18, 2008 cited in Application No. 200510092142.6.
Chinese First Office Action dated May 23, 2008 cited in Application No. 200510089514.X.
Philippines Examiner's Action dated Sep. 12, 2008 cited in Application No. 1200500406.
Microsoft Office 11 Beta Layperson's Specification, Copyright 2002, Microsoft Corporation, 28 pgs.
FrontPage 11 Beta Layperson's Specification, Copyright 2002, Microsoft Corporation, 12 pgs.
Office 11 Beta Letter, Copyright 2002, Microsoft Corporation, 6 pgs.
Microsoft XDocs Beta Layperson Specification, Copyright 2002, Microsoft Corporation, 3 pgs.
Microsoft Publisher 11 Beta Layperson's Specification, Copyright 2002, Microsoft Corporation, 13 pgs.
Microsoft Office Word 2003, Part of Microsoft Office Professional Edition 2003, 1983-2003 Microsoft Corporation, screen shot 1, 1 pp.
Microsoft Office 2003, Microsoft Office Professional Edition 2003, Microsoft Corporation, 10 pages.
Chinese Second Office Action dated Nov. 21, 2008 cited in Appln No. 200510089514.X.
U.S. Official Action dated Jun. 19, 2008 cited in U.S. Appl. No. 10/851,506.
U.S. Official Action dated Jun. 20, 2008 cited in U.S. Appl. No. 10/955,928.
U.S. Official Action dated Jul. 17, 2008 cited in U.S. Appl. No. 10/955,940.
U.S. Official Action dated Dec. 24, 2008 in U.S. Appl. No. 10/955,967.
U.S. Official Action dated Jan. 6, 2009 in U.S. Appl. No. 10/955,941.
Chilean Office Action dated Nov. 27, 2008 cited in Appln No. 1768-2005.
Chilean Office Action dated Sep. 23, 2008 cited in Appln No. 1770-2005.
Chilean Office Action dated Nov. 27, 2008 cited in Appln No. 1769-2005.
U.S. Appl. No. 12/372,386, filed Feb. 17, 2009 entitled "Command User Interface for Displaying Multiple Sections of Software Functionality Controls".
Chinese Office Action dated Apr. 3, 2009 cited in Appln No. 200510089514.X.
U.S. Office Action dated Mar. 18, 2009 in U.S. Appl. No. 11/401,470.
U.S. Office Action dated Apr. 7, 2009 in U.S. Appl. No. 10/955,940.
Chilean Second Office Action dated Mar. 4, 2009 cited in Appln No. 2512-2005.
U.S. Office Action dated Apr. 28, 2009 in U.S. Appl. No. 12/028,797.
Nielsen, Jacob. "Tabs, Used Right," Alertbox, Sep. 17, 2007, http://www.useit.com/alertbox/tabs.html, 6 pages.
"Managing the Code Editor and View" Microsoft Corporation, http://msdn.microsoft.com/en-us/library/z01zks9a(VS.71).aspx, 2008.
Agarwal, Vikash K., "Creating a Visually Arresting User-Interface: A 3D Tab Control Example," Jan. 4, 2008, http://microsoft.apress.com/asptodayarchive/71723/creating-a-visually-arresting-user-interface-a-3d-tab-control-example, 12 pages.
"Omni Web Help," Omni Group, 2004, http://www.omnigroup.com/documentation/omniweb/browser/tabs.html, 2 pages.
Hepfner, Troy, "New SOCET CXP Interface Improves Usability," Sep. 2008, http://www.socetset.com/gxpmosaic/?p=95, 4 pages.
U.S. Office Action dated Nov. 25, 2008 cited in U.S. Appl. No. 11/154,278.
U.S. Office Action dated Dec. 11, 2008 cited in U.S. Appl. No. 10/982,073.
Billo, E. Joseph. "Creating Charts: An Introduction," Excel for Chemists: . A Comprehensive Guide, http://www.ahut.edu.cn/yxsz/ahk/Teaching/Excel%for%20Chemists/ChQ2.pdf, 9 pages.
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf, 7 pages.
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
Lisa K. Averett; Joshua R. Knisley; Mark A. Marvin; Haiti: Projecting Tactical Network and Systems Management; 1995 IEEE pp. 906-910.
Mexican Office Action dated Feb. 5, 2009 cited in Appln No. PA/a/2005/008349.

Mexican Office Action dated Mar. 3, 2009 cited in Appln No. PA/a/2005/008351 English language only.
Chinese Third Office Action dated Jun. 19, 2009 cited in Appln No. 200510092139.4.
Russian Office Action dated Jun. 24, 2009 cited in Appln No. 2005120363/28(023023).
U.S. Official Action dated Feb. 22, 2008 in U.S. Appl. No. 11/445,393.
U.S. Official Action dated Oct. 8, 2008 cited in U.S. Appl. No. 11/445,393.
U.S. Official Action dated Jun. 1, 2009, U.S. Appl. No. 11/445,393.
U.S. Official Action dated Jun. 8, 2009 in U.S. Appl. No. 10/982,073.
U.S. Official Action dated Jun. 10, 2009 in U.S. Appl. No. 11/154,278.
U.S. Official Action dated Jun. 11, 2009 in U.S. Appl. No. 11/151,686.
U.S. Official Action dated Jun. 24, 2009 in U.S. Appl. No. 10/607,020.
Russian Office Action dated Jul. 21, 2009 cited in Appln No. 2005125837/09(029011).
Russian Office Action dated Jul. 30, 2009 cited in Appln No. 2005125831/09(029005).
European Search Report dated Sep. 7, 2009 cited in EP Application No. 09006972.5-2211.
European Communication dated Sep. 14, 2009 cited in Appln. No. 07795391.7-1225.
U.S. Official Action dated Aug. 4, 2009 in U.S. Appl. No. 10/955,967.
U.S. Official Action dated Aug. 18, 2009 in U.S. Appl. No. 11/782,059.
U.S. Official Action dated Sep. 23, 2009 in U.S. Appl. No. 11/401,470.
Berliner E.M. et al., "Microsoft Office 2003", Feb. 24, 2004, p. 39-40, 120-124, 175-177, 233-234 [D1].
Berliner E.M. et al., "Microsoft Office 2003", Feb. 24, 2004, p. 173-178 [D2].
Israeli Office Action dated Sep. 6, 2009 cited in Appln No. 169716.
Israeli Office Action dated Sep. 7, 2009 cited in Appln No. 169718.
Russian Office Action dated Sep. 10, 2009 cited in Appln No. 2005125836/09(029010).
Russian Office Action dated Sep. 10, 2009 cited in Appln No. 2005125839/09(029013).
European Communication dated Sep. 28, 2009 cited in Appln No. 09006972.May 2211.
Chinese Office Action dated Oct. 16, 2009 cited in Appln No. 200510092142.6.
U.S. Official Action dated Nov. 24, 2009 in U.S. Appl. No. 11/445,393.
Perronne et al. "Building Java Enterprise Systems with J2EE", Publisher: Sams, Pub Date: Jun. 7, 2000 (pp. 1-8).
Russian Office Action dated Oct. 26, 2009 cited in Appln No. 2005120363/09(023023).
PCT Search Report and Written Opinion dated Dec. 29, 2009 cited in International Application No. PCT/US2009/046344.
U.S. Official Action dated Sep. 6, 2007 in U.S. Appl. No. 11/136,800.
U.S. Official Action dated Jul. 9, 2008 cited in U.S. Appl. No. 11/136,800.
U.S. Official Action dated Nov. 13, 2009 in U.S. Appl. No. 11/154,278.
U.S. Official Action dated Dec. 8, 2009 in U.S. Appl. No. 11/151,686.
U.S. Official Action dated Dec. 9, 2009 in U.S. Appl. No. 12/028,797.
U.S. Official Action dated Dec. 10, 2009 in U.S. Appl. No. 10/955,940.
U.S. Final Office Action dated Jan. 6, 2010 cited in U.S. Appl. No. 10/607,020.
U.S. Official Action dated Jan. 20, 2010 cited in U.S. Appl. No. 10/955,967.
U.S. Office Action dated Jan. 25, 2010 cited in U.S. Appl. No. 10/982,073.
U.S. Appl. No. 12/725,605, filed Mar. 17, 2010 entitled "Improved User Interface for Displaying Selectable Software Functionality Controls that are Relevant to a Selected Object".
U.S. Appl. No. 12/753,923, filed Apr. 5, 2010 entitled "Automatic Grouping of Electronic Mail".
Chinese Office Action dated Jan. 22, 2010 cited in Appln No. 200680032564.7.
Chilean Second Office Action dated Jan. 29, 2010 cited in Appln No. 1769-2005.
Chinese Third Office Action dated Feb. 12, 2010 cited in Appln No. 200510092142.6.
Philippines Examiner's Action dated Mar. 11, 2010 cited in Appln No. 1-2005-000405.
Chinese Office Action dated Mar. 11, 2010 cited in Appln No. 200780020312.7.
Australian Office Action dated Mar. 25, 2010 cited in Appln No. 2005203411.
Australian Office Action dated Mar. 25, 2010 cited in Appln No. 2005203412.
Australian Office Action dated Mar. 26, 2010 cited in Appln No. 2005203409.
Australian Office Action dated Apr. 8, 2010 cited in Appln No. 2005203410.
U.S. Official Action dated Feb. 18, 2010 in U.S. Appl. No. 11/782,059.
U.S. Official Action dated Feb. 22, 2010 in U.S. Appl. No. 11/401,470.
U.S. Appl. No. 12/769,787, filed Apr. 29, 2010 entitled "Conversation Grouping of Electronic Mail Records".
U.S. Appl. No. 12/777,287, filed May 11, 2010 entitled "User Interface for Providing Task Management and Calendar Information".
U.S. Appl. No. 11/217,071, filed Aug. 30, 2005 entitled "Markup Based Extensibility for User Interfaces".
Clifton, The Application Automation layer—Using XML to Dynamically Generale GUI Elements—forms and controls, The Code Project, Jun. 2003, pp. 1-37.
Australian Office Action dated May 28, 2010 cited in Appln No. 2005202717.
U.S. Official Action dated Mar. 30, 2010 in U.S. Appl. No. 11/217,071.
U.S. Official Action dated Apr. 15, 2010 in U.S. Appl. No. 11/823,999.
U.S. Official Action dated May 5, 2010 in U.S. Appl. No. 10/851,506.
U.S. Official Action dated May 25, 2010 in U.S. Appl. No. 10/607,020.
U.S. Official Action dated Jun. 3, 2010 in U.S. Appl. No. 12/028,797.
U.S. Official Acton dated Jun. 22, 2010 in U.S. Appl. No. 11/430,562.
U.S. Official Action dated Jun. 23, 2010 in U.S. Appl. No. 10/955,940.
U.S. Official Action dated Jul. 1, 2010 in U.S. Appl. No. 11/782,059.
U.S. Official Action dated Jul. 6, 2010 in U.S. Appl. No. 10/955,967.
ScreenShot of MS_Office_2003; (Microsoft Corporation, Microsoft Office Professional Edition 2003; 6 pages).
U.S. Official Action dated Sep. 21, 2010 in U.S. Appl. No. 11/217,071.
U.S. Official Action dated Sep. 27, 2010 in U.S. Appl. No. 10/836,154.
Halvorson et al., Microsoft Office Professional Official Manual, Aug. 20, 2002, 10 pgs.
Chinese Second Office Action dated Jul. 6, 2010 cited in Appln No. 200680033212.3.
Mexican Office Action dated Aug. 12, 2010 cited in Appln No. 2005/008354.
U.S. Official Action dated Aug. 6, 2010 in U.S. Appl. No. 11/401,470.
PCT Written Opinion and Search Report dated Sep. 2, 2010 cited in International Application No. PCT/US2010/021888.
Malaysian Substantive Examination Adverse Report dated Sep. 30, 2010 cited in Appln No. PI 20052959.
Australian Office Action dated Oct. 21, 2010 cited in Appln No. 2006284908.
Chinese Second Office Action dated Oct. 29, 2010 cited in Appln No. 200680030421.2.
U.S. Appl. No. 12/954,952, filed Sep. 29, 2010 entitled "Gallery User Interface Controls".
Bellavista et al., "A Mobile Infrastructure for Terminal, User, and Resource Mobility", Network Operations and Management Symposium, NOMS 2000, pp. 877-890, IEEE/IFIP.
U.S. Official Action dated Nov. 9, 2010 in U.S. Appl. No. 10/607,020.

U.S. Official Action dated Nov. 22, 2010 in U.S. Appl. No. 11/782,059.
U.S. Official Action dated Nov. 26, 2010 in U.S. Appl. No. 12/753,923.
Israeli Office Action dated Oct. 28, 2010 cited in Appln No. 169716.
U.S. Official Action dated Dec. 8, 2010 in U.S. Appl. No. 10/851,506.
U.S. Official Action dated Dec. 8, 2010 in U.S. Appl. No. 10/955,967.
U.S. Official Action dated Dec. 16, 2010 in U.S. Appl. No. 11/430,562.
U.S. Official Action dated Dec. 20, 2010 in U.S. Appl. No. 11/445,393.
U.S. Official Action dated Dec. 20, 2010 in U.S. Appl. No. 12/574,256.
U.S. Official Action dated Dec. 29, 2010 in U.S. Appl. No. 12/028,787.
U.S. Official Action dated Jan. 5, 2011 in U.S. Appl. No. 11/823,999.
U.S. Appl. No. 13/027,289, filed Feb. 15, 2011 entitled "Floating Command Object".
Padwick, Gordon "Using Microsoft Outlook 2000," 1999 Que Publishing, pp. 530-533.
Slovak, Ken. "Absolute Beginner's Guide to Microsoft Office Outlook 2003." 2003, Que Publishing, pp. 237-241.
Microsoft Press, Microsoft Computer Dictionary, Microsoft Press, Fifth Edition, 2002, pp. 374, 382.
Riggsby, McCoy, Haberman and Falciani, "Mastering Lotus Notes and Domino 6." 2003, pp. 18, 22, 33-35, 47, 122, 123, 215-241, 378.
"About Google Desktop Search", http://www.desktop.google.com/about.html, Oct. 15, 2004, 8 pages.
Find any file or email on your PC as fast as you can type!, http://www.x1.com, 2003, 1 page.
"Lookout", http://www.lookoutsoft.com, Apr. 22, 2005, 20 pages.
"Yahoo to test desktop search", http://news.com.cotn/yahoo+to+test+desktop+searcach/2100-1032_3-5486381.html, Dec. 9, 2004, 6 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Windows Desktop Search". Http://kunal.kundale.net/reviews/wds.html, Jul. 10, 2005, 7 pages.
"Microsoft Enters Desktop Search Fray", http://www.internetnews.com/ent-news/article.php/3447331, Dec. 13, 2004, 5 pages.
Adler, "Emerging Standards for Component Software," Cybersquare, 1995 IEEE, 10 pgs.
Chamberland, et al., "IBM VisualAge for Java," vol. 37, No. 3, 1998, 26 pgs., http://researchweb.watson.ibm.com/journal/sj/373/chamberland.html [Accessed Feb 6, 2007].
Zykov, "ConceptModeller: A Problem-Oriented Visual SDK for Globally Distributed Enterprise Systems." Proceedings of the 7th International Workshop on Computer Science and Information Technologies, CSIT 2005, 4 pgs.
"Create Office add-ins: ribbons, toolbars, taskpanes, menus etc.", http://www.add-in-express.com/creating-addins-blog/feed/.
"RibbonX API: Extend the 2007 Office System with Your Own Ribbon Tabs and Controls", 2007, Microsoft Corporation, http://msdn.microsoft.com/msdnmag/issues/07/02RibbonX/de-fault.aspx.
"What's New in Excel 2007", Feb. 26, 2007.
Whitechapel et al., "Microsot Visual Studio 2005 Tools for the 2007 Microsoft Office", Sep. 2006, http://72.14.235.104/search?q=cache:kXdufDB6o-wJ:download.microsoft.com/download/3/2/d/32db7049-bc04-4c79-a91b-7f62eaae754a/VSTO2005SE_Tutorial.doc+This+tutorial+focuses+on+the+new+features+introduced+in+VSTO+2005_SE&hl=en&ct=clnk&cd=3&gl=in.
NZ Application No. 541301, Examination Report dated Jul. 25, 2005.
NZ Application No. 541299, Examination Report dated Jul. 25, 2005.
PCT Written Opinion and Search Report dated Jan. 9, 2007 cited in International Application No. PCT/US2006/033809.
European Search Report dated Nov. 25, 2008 cited in Application EP 06 79 0087.
European Office Action mailed Mar. 9, 2009 cited in Appln No. 06790087.8.
Russian Office Action dated Oct. 30, 2009 cited in Appln No. 2005125837/09.
Chilean Second Office Action dated Nov. 4, 2009 cited in Appln No. 1770-2005.
Chinese Office Action dated Nov. 27, 2009 cited in Appln No. 200680033212.3.
PCT Search Report and Written Opinion dated Nov. 30, 2009 cited in International Application No. PCT/US2009/046341.
Chilean Second Office Action dated Dec. 4, 2009 cited in Appln No. 1768-2005.
Russian Office Action dated Dec. 28, 2009 cited in Appln No. 2005125836/09(029010).
Mexican Office Action dated May 4, 2010 cited in Appln No. 2005/008354.
Israeli Office Action dated Jul. 5, 2010 cited in Appln No. 169718.
Notice on Reexamination dated Jan. 21, 2011 cited in Appln No. 200510089514.X.
Chinese Third Office Action dated Feb. 10, 2011 cited in Appln No. 200680033212.3.
U.S. Official Action dated May 30, 2008 in U.S. Appl. No. 11/430,562.
U.S. Official Action dated Jun. 27, 2008 in U.S. Appl. No. 11/430,416.
U.S. Official Acton dated Nov. 13, 2008 in U.S. Appl. No. 11/430,562
U.S. Official Action dated Jan. 9, 2009 in U.S. Appl. No. 11/430,561.
U.S. Official Acton dated Jun. 19, 2009 in U.S. Appl. No. 11/430,562.
U.S. Official Action dated Aug. 17, 2009 in U.S. Appl. No. 11/430,561.
U.S. Official Action dated Sep. 15, 2009 in U.S. Appl. No. 11/217,071.
U.S. Official Acton dated Jan. 7, 2010 in U.S. Appl. No. 11/430,562.
U.S. Official Action dated Feb. 11, 2011 in U.S. Appl. No. 11/401,470.
Egypt Official Decision dated Mar. 14, 2011 cited in Appln No. 2005080371.
Malaysian Substantive Examination Adverse Report dated Mar. 15, 2011 cited in Appln No. PI 20053260.
2nd Notice on Reexamination dated Mar. 25, 2011 cited in Appln No. 200510089514.X.
Philippines Examiner's Action dated Apr. 12, 2011 cited in Appln No. 1-2005-00404.
U.S. Official Action dated Mar. 14, 2011 in U.S. Appl. No. 12/163,784.
U.S. Official Action dated Apr. 21, 2011 in U.S. Appl. No. 11/445,393.
U.S. Official Action dated Apr. 21, 2011 in U.S. Appl. No. 12/574,256.
U.S. Appl. No. 13/102,633, filed May 6, 2011 entitled "Markup Based Extensibility for User Interfaces".
"The New "Office 2007" User Interface", Microsoft Corporation © 2005, 32 pgs.
"The New Look in Office 12 / Office 2007", OFFICE Watch, posted Sep. 20, 2005, 9 pgs.
Atwood, "Sometime a Word is Worth a Thousand Icons", Coding Horror, Feb. 22, 2006, 9 pgs.
Seo et al, "Hangul Office 2000 Tutoring Book", Sep. 15, 2000, 16 pgs. (Cited in Korean Notice of Rejection May 17, 2011.
PCT Written Opinion and Search Report dated Nov. 29, 2010 cited in International Application No. PCT/US2010/034277.
Japanese Notice of Rejection dated May 6, 2011 cited in Appln. No. 2005-236089.
Japanese Notice of Rejection dated May 6, 2011.
Korean Notice of Rejection dated May 17, 2011.
Chinese Second Office Action dated May 19, 2011.
U.S. Official Action dated May 5, 2011 in U.S. Appl. No. 10/836,154.
U.S. Official Action dated May 12, 2011 in U.S. Appl. No. 12/753,923.
U.S. Official Action dated May 19, 2011 in U.S. Appl. No. 11/430,562.
U.S. Official Action dated May 19, 2011 in U.S. Appl. No. 10/851,506.
Office 2007, Microsoft, Released on Nov. 6, 2006, 23 pgs. (Cited in 1275us01 Jun. 9, 2011 OA).
Mexican Office Action dated Mar. 31, 2011 cited in Appln No.PA/a/2005/008351.

Mexican Office Action dated Mar. 31, 2011 cited in Appln No. PA/a/2005/008349.
Mexican Office Action dated Mar. 31, 2011 cited in Appln No. PA/a/2005/008350.
Russian Office Action dated Jun. 14, 2011 cited in Appln No. 2008147090.
U.S. Official Action dated Jun. 9, 2011 in U.S. Appl. No. 12/464,584.
Homeworking Forum; archived Dec. 6, 2004; 11 pgs. (Cited in Jun. 7, 2011 OA).
Japanese Office Action dated Jun. 10, 2011 cited in JP Application No. 2008-530229, w/translation.
Chinese Third Office Action dated Jun. 21, 2011 cited in Appln No. 200680030421.2.
Chinese Second Office Action dated Jul. 14, 2011 cited in Appln No. 20080018095.3.
Chinese Decision on Rejection dated Jul. 21, 2011 cited in Appln No. 20068032789.2.
U.S. Official Action dated Jun. 7, 2011 in U.S. Appl. No. 11/332,822.
U.S. Official Action dated Aug. 3, 2011 in U.S. Appl. No. 12/142,927.
The Discussion Board Component of Blackboard: An Instructor's Guide; Aug. 2004; 23 pgs. (cited in Jan. 6, 2011 OA).
Hock, "Yahoo! To the Max"; May 10, 2005; 5 excerpted pgs. (cited in Jan. 6, 2011 OA).
Gina Danielle Venolia et al., Supporting Email Workflow, revised Dec. 2001; 11 pgs. (cited in OA Jan. 6, 2011).
Mock et al., "An Experimental Framework for Email Categorization and Management", Sep. 9-12, 2001, 3 pgs.
Yang, "Email Categorization Using Fast Machine Learning Algorithms", 2002, 8 pgs.
Islam et al., "Email Categorization Using Multi Stage Classification Technique", 2007, 3 pgs.
"Look and Layout", retrieved at <<http://liv.ac.uk/csd/email/outlook/layout.htm>>, University of Liverpool, 9 pgs.
"Preview Pane in Conversation: 4 pane view", 2005, Zinbra Inc., 3 pgs.
"Reading Pane in Conversation View", retrieved at <<http://www.zimbra.com/forums/users/5918-reading-pane-conversation-view.html>>, 5 pgs.
Ohmori, Yasuo et al., "Eigyo Mind—A Sales Support Tool," PFU Tech. Rev., vol. 10, No. 1, pp. 32-38, PFU Limited, May 1, 1999.
New Zealand Office Action dated Oct. 14, 2009 cited in NZ Application No. 566363.
European Office Action dated Jun. 15, 2010 cited in EP Application No. 06814358.5.
Russian Office Action dated Jul. 26, 2010 cited in RU Application No. 2008109034, w/translation.
Chinese Office Action dated Nov. 11, 2010 cited in CN Application No. 200680032789.2, w/translation.
Russian Office Action dated Nov. 12, 2010 cited in Application No. 2008109034, w/translation.
Mexican Office Action dated Jan. 6, 2011 cited in Appln No. PA/a/2005/008354.
Australian OA dated Jan. 17, 2011 cited in Application No. 2006287408.
Chinese Second Office Action dated Apr. 7, 2011 cited in Application No. 200680032789.2, w/translation.
Korean Notice of Preliminary Rejection dated Jul. 22, 2011 cited in Appln No. 10-2005-0058160.
Japanese Notice of Rejection dated Aug. 12, 2011 cited in Appln. No. 2005-184990.
Korean Preliminary Rejection dated Aug. 23, 2011 cited in Appln. No. 10-2005-0067236.
Korean Preliminary Rejection dated Aug. 23, 2011 cited in Appln. No. 10-2005-0067411.
Australian Office Action dated Aug. 31, 2011 cited in Appln. No. 2007255043.
U.S. Official Action dated Oct. 5, 2009 in U.S. Appl. No. 11/332,822.
U.S. Official Action dated Apr. 23, 2010 in U.S. Appl. No. 12/144,642.
U.S. Official Action dated Jun. 25, 2010 in U.S. Appl. No. 11/332,822.
U.S. Official Action dated Sep. 16, 2010 in U.S. Appl. No. 12/144,642.
U.S. Official Action dated Jan. 6, 2011 in U.S. Appl. No. 12/142,927.
U.S. Official Action dated Feb. 1, 2011 in U.S. Appl. No. 11/332,822.
U.S. Official Action dated Feb. 1, 2011 in U.S. Appl. No. 12/144,642.
U.S. Official Action dated Jul. 8, 2011 in U.S. Appl. No. 11/401,470.
U.S. Official Action dated Jul. 8, 2011 in U.S. Appl. No. 12/163,784.
Mexican Office Action dated May 26, 2011 cited in Appln. No. MX/a/2009/004151.
Korean Preliminary Rejection dated Aug. 29, 2011 cited in Appln. No. 10-2005-0066460.
3rd Official Notice, Mailing No. 134028, dated Sep. 16, 2001 cited in Appln. No. PH1707009.
4th Official Notice, Mailing No. 134052, dated Sep. 16, 2001 cited in Appln. No. PH1707009.
Mexican Office Action dated Oct. 3, 2011 cited in Appln. No. MX/a/2008/014849.
U.S. Official Action dated Sep. 13, 2011 in U.S. Appl. No. 12/372,386.
U.S. Official Action dated Sep. 14, 2011 in U.S. Appl. No. 12/163,758.
U.S. Official Action dated Oct. 25, 2011 in U.S. Appl. No. 12/144,642.
U.S. Official Action dated Nov. 2, 2011 cited in U.S. Appl. No. 10/836,154.
Dr. Dobb's Journal; "Windows 95 Common Controls"; May 1, 1995; 12 pgs. (cited in Dec. 6, 2011 EP Search Rpt).
Korean Notice of Rejection dated Nov. 3, 2011 cited in Appln No. 10-2005-0067257.
Japanese Notice of Rejection dated Nov. 4, 2011 cited in Appl No. 2008-513476.
Japanese Notice of Rejection dated Nov. 11, 2011 cited in Appln. No. 2008-530229.
Chinese Office Action dated Nov. 18, 2011 cited in Appln. No. 200910148820.4.
Chinese Office Action dated Nov. 29, 2011 cited in Appln. No. 200980124383.0.
Chinese Third Office Action dated Dec. 5, 2011 cited in Appln. No. 200680018095.3.
European Search Report dated Dec. 6, 2011 cited in Appln No. 06803424.8.
Japanese Notice of Rejection dated Dec. 16, 2011 cited in Appln No. 2008-529218.
U.S. Official Action dated Jan. 12, 2012 cited in U.S. Appl. No. 11/782,059.

* cited by examiner

USER INTERFACE FOR DISPLAYING A GALLERY OF FORMATTING OPTIONS APPLICABLE TO A SELECTED OBJECT

CROSS-REFERENCE TO RELATED APPLICATIONS

The present application claims priority to U.S. Provisional Application No. 60/601,815, filed Aug. 16, 2004, entitled "Improved User Interfaces for Computer Software Applications."

FIELD OF THE INVENTION

The present invention generally relates to software application user interfaces. More particularly, the present invention relates to an improved user interface for displaying a gallery of images illustrating different formatting options applicable to a selected object.

BACKGROUND OF THE INVENTION

With the advent of the computer age, computer and software users have grown accustomed to user-friendly software applications that help them write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects.

To assist users to locate and utilize functionality of a given software application, a user interface containing a plurality of generic functionality controls is typically provided along an upper, lower or side edge of a displayed workspace in which the user may enter, copy, manipulate and format text or data. Such functionality controls often include selectable buttons with such names as "file," "edit," "view," "insert," "format," and the like. Typically, selection of one of these top-level functionality buttons, for example "format," causes a drop-down menu to be deployed to expose one or more selectable functionality controls associated with the top-level functionality, for example "font" under a top-level functionality of "format."

Modern software applications allow users to apply a seemingly infinite number of formatting options combinations to a given document or object. For example, a text document may have many fonts, text sizes, heading formats, display/print settings, and the like. For another example, a picture object may be shaded, rotated, colored, resized, cropped, stylized, and the like. A typical user often has difficulty visualizing possible formatting options combinations, and even if the user can visualize an interesting and desirable formatting options combination, the user may lack the skill to select appropriate individual formatting options to create the desired format.

Accordingly, there is a need in the art for an improved user interface for displaying a gallery of images showing different formatting options combinations that may be applied to a selected object which when selected by a user cause the automatic application of a selected formatting options combination to a selected object. It is with respect to these and other considerations that the present invention has been made.

SUMMARY OF THE INVENTION

Embodiments of the present invention solve the above and other problems by providing an improved user interface for displaying a gallery of images showing different formatting options combinations that may be applied to a selected object which when selected by a user may cause the automatic application of an associated formatting options combination to the selected object.

According to one aspect of the invention, sets of commands may be combined and may be associated with each image so that application of a given formatting options combination may be made to a selected or inserted object by selecting the associated image. According to another aspect of the invention, a preview of the application of a given formatting options combination to a selected object may be provided upon mouse-over or other focus on an image illustrating formatting according to the given formatting options combination. According to this aspect, once the focus or mouse-over is ceased, the formatting of the selected object returns to the original state.

According to another aspect of the invention, methods and systems provide a user interface in which is displayed a gallery of formatting controls where each formatting control illustrates a distinct formatting options combination that may be applied to a selected object. Upon receiving an indication of the selection of an object for formatting via a software application, the user interface is provided containing one or more formatting controls. A visual representation of the selected object for each of the one or more formatting controls is illustrated showing how the selected object will be formatted if the formatting attributes associated with each of the one or more formatting controls are applied to the selected object. Upon receiving an indication of a selection of one of the one or more formatting controls, formatting attributes associated with the selected formatting control are automatically applied to the selected object. According to another aspect, upon receiving an indication of focusing on a given one of the one or more formatting controls, the one or more formatting attributes associated with the focused-on formatting control may be dynamically applied to the selected object to show how the selected object will be formatted if the one or more formatting attributes associated with the focused-on formatting control are applied to the selected object.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to an improved user interface for displaying a gallery of images showing different formatting options combinations that may be applied to a selected object. According to embodiments of the present invention, all commands necessary for applying a given formatting options combination as represented by a displayed image may be executed by selecting the image. Selecting a displayed image from the gallery of images causes the formatting options combination to be automatically applied to the selected object. According to other embodiments of the present invention, focusing on or mousing-over a displayed image may cause a dynamic application of the formatting options combination associated with the focused-on image to a selected object to show a user how the selected object will be displayed if the formatting options combination associated with the focused-on image is actually selected for application to the selected object.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
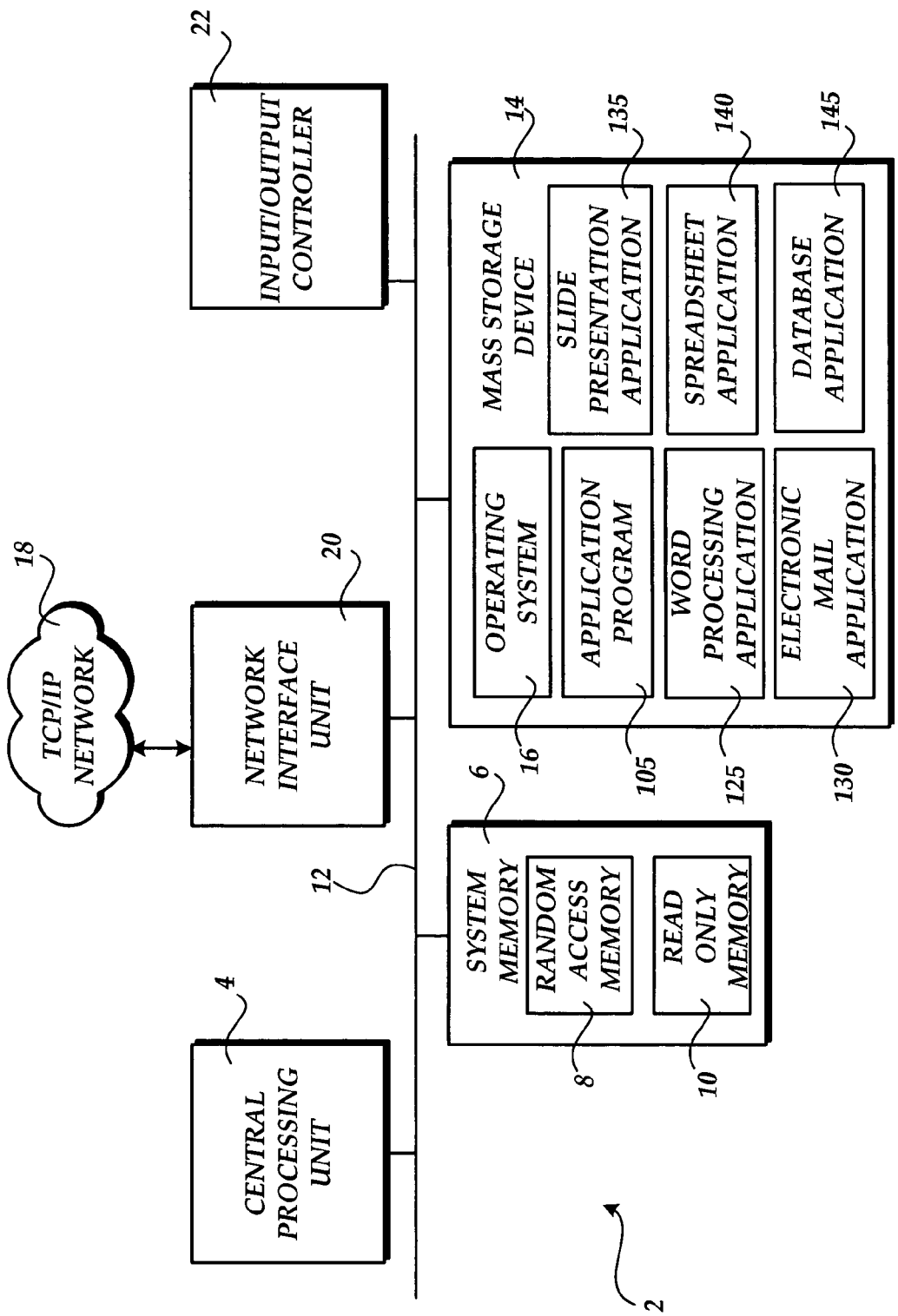
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 105, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for providing a variety of functionalities to a user. For instance, the application program 105 may comprise many types of programs such as a word processing application, a spreadsheet application, a desktop publishing application, and the like. According to an embodiment of the present invention, the application program 105 comprises a multiple functionality software application for providing word processing functionality, slide presentation functionality, spreadsheet functionality, database functionality and the like. Some of the individual program modules that may comprise the multiple functionality application 105 include a word processing application 125, a slide presentation application 135, a spreadsheet application 140 and a database application 145. For purposes of illustration, the applications 125, 135, 140, 145 are shown as separate modules in FIG. 1, but, as should be understood, each of these applications may be modules of the multiple functionality application 105. An example of such a multiple functionality application 105 is OFFICE manufactured by Microsoft Corporation. Other software applications illustrated in FIG. 1 include an electronic mail application 130.

Figure 2:
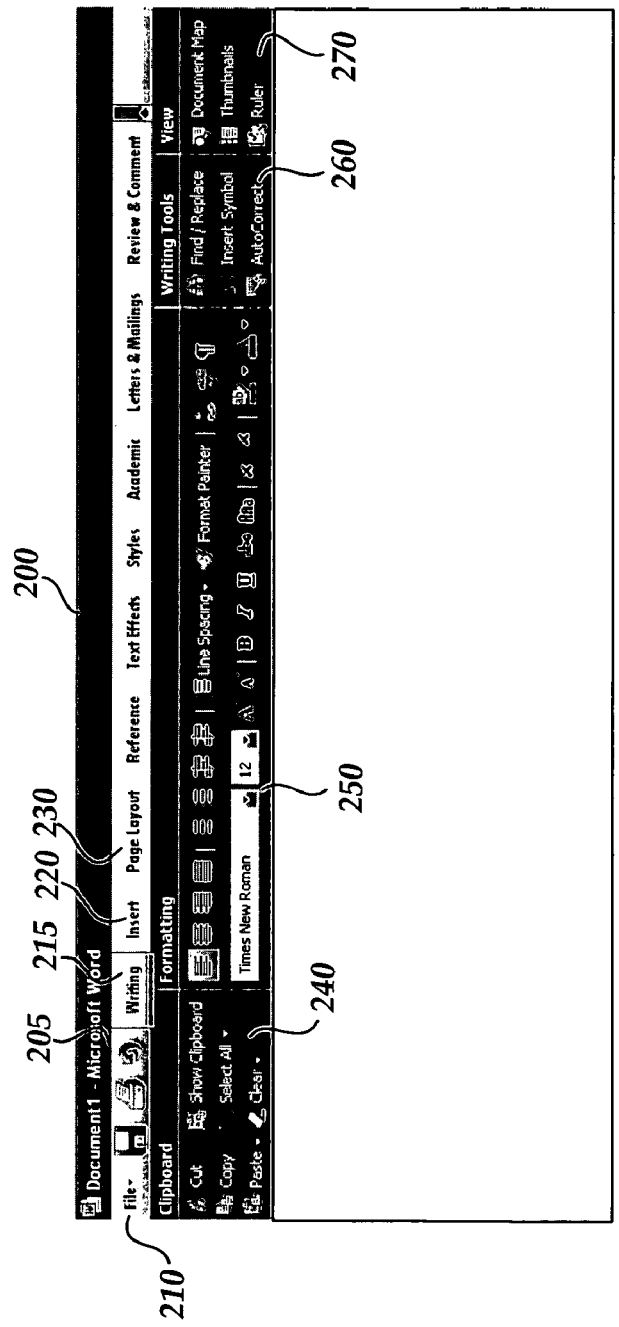
FIG. 2 is an illustration of a computer screen display showing a ribbon-shaped user interface for displaying task-based top-level functionality tabs and for displaying a plurality of functionalities available under a selected top-level functionality tab.

FIG. 2 is an illustration of a computer screen display showing a ribbon-shaped user interface for displaying task-based top-level functionality tabs and for displaying a plurality of functionalities available under a selected top-level functionality tab. As briefly described above, the improved user interface of the present invention includes a ribbon-shaped user interface for displaying selectable controls associated with task-based functionality available under a given software application, such as the software application 105 illustrated in FIG. 1. A first section 210 of the user interface 200 includes generic selectable controls for functionality not associated with a particular task, such as word processing versus spreadsheet data analysis. For example, the section 210 includes selectable controls for general file commands such as "file open," "file save" and "print." According to one embodiment of the present invention, the selectable controls included in the first section 210 are controls that may be utilized by a variety of software applications comprising a multiple functionality application 105. That is, the selectable controls included in the first section 210 may be controls that are generally found and used across a number of different software applications.

Selectable controls included in the first section 210 may be utilized for all such applications comprising such a multiple functionality application, but other selectable controls presented in the user interface 200 described below, may be tailored to particular tasks which may be performed by particular software applications comprising the multiple functionality application. On the other hand, it should be appreciated that the user interface 200 described herein may be utilized for a single software application such as a word processing application 125, a slide presentation application 135, a spreadsheet application 140, a database application 145, or any other software application which may utilize a user interface for allowing users to apply functionality of the associated application.

Referring still to FIG. 2, adjacent to the first section 210 of the user interface 200 is a task-based tab section. The tab section includes selectable tabs associated with task-based functionality provided by a given software application. For purposes of example, the task-based tabs illustrated in FIG. 2 are associated with tasks that may be performed using a word processing application 125. For example, a "Writing" tab 215 is associated with functionality that may be utilized for performing writing tasks. An "Insert" tab 220 is associated with functionality associated with performing insert operations or tasks. A "Page Layout" tab 230 is associated with functionality provided by the associated application for performing or editing page layout attributes of a given document.

As should be appreciated, many other task-based tabs or selectable controls may be added to the tab section of the user interface for calling functionality associated with other tasks. For example, task tabs may be added for text effects, document styles, review and comment, and the like. And, as described above, the user interface 200 may be utilized for a variety of different software applications. For example, if the user interface 200 is utilized for a slide presentation application, tabs contained in the tab section may include such tabs as "Create Slides," "Insert," "Format," "Drawing," "Effects," and the like associated with a variety of tasks that may be performed by a slide presentation application. Similarly, tabs that may be utilized in the tab section of the user interface 200 for a spreadsheet application 140 may include such tabs as "Data" or "Data Entry," "Lists," "Pivot Tables," "Analysis," "Formulas," "Pages and Printing," and the like associated with tasks that may be performed using a spreadsheet application.

Immediately beneath the generic controls section 210 and the task-based tab section is a selectable functionality control section for displaying selectable functionality controls associated with a selected tab 215, 220, 230 from the task-based tab section. According to embodiments of the present invention, when a particular tab, such as the "Writing" tab 215 is selected, selectable functionality available from the associated software application for performing the selected task, for example a writing task, is displayed in logical groupings. For example, referring to FIG. 2, a first logical grouping 240 is displayed under a heading "Clipboard." According to embodiments of the present invention, the clipboard section 240 includes selectable functionality controls logically grouped together and associated with clipboard actions underneath the general task of writing. For example, the clipboard section 240 may include such selectable controls as a cut control, a copy control, a paste control, a select all control, etc. Adjacent to the clipboard section 240, a second logical grouping 250 is presented under the heading "Formatting."

Selectable controls presented in the "Formatting" section 250 may include such selectable controls as text justification, text type, font size, line spacing, boldface, italics, underline, etc. Accordingly, functionalities associated with formatting operations are logically grouped together underneath the overall task of "Writing." A third logical grouping 260 is presented under the heading "Writing Tools." The writing tools section 260 includes such writing tools as find/replace, autocorrect, etc. According to embodiments of the present invention, upon selection of a different task-based tab from the tab section, a different set of selectable functionality controls in different logical groupings is presented in the user interface 200 associated with the selected task-based tab. For example, if the "Insert" task tab 220 is selected, the selectable functionality controls presented in the user interface 200 are changed from those illustrated in FIG. 2 to include selectable functionality controls associated with the insert task. For detailed information regarding the user interface 200, illustrated in FIG. 2, see U.S. patent application Ser. No. 10/955, 967, entitled "Command User Interface for Displaying Selectable Software Functionality Controls," which is incorporated herein by reference as if fully set out herein.

Figure 3:
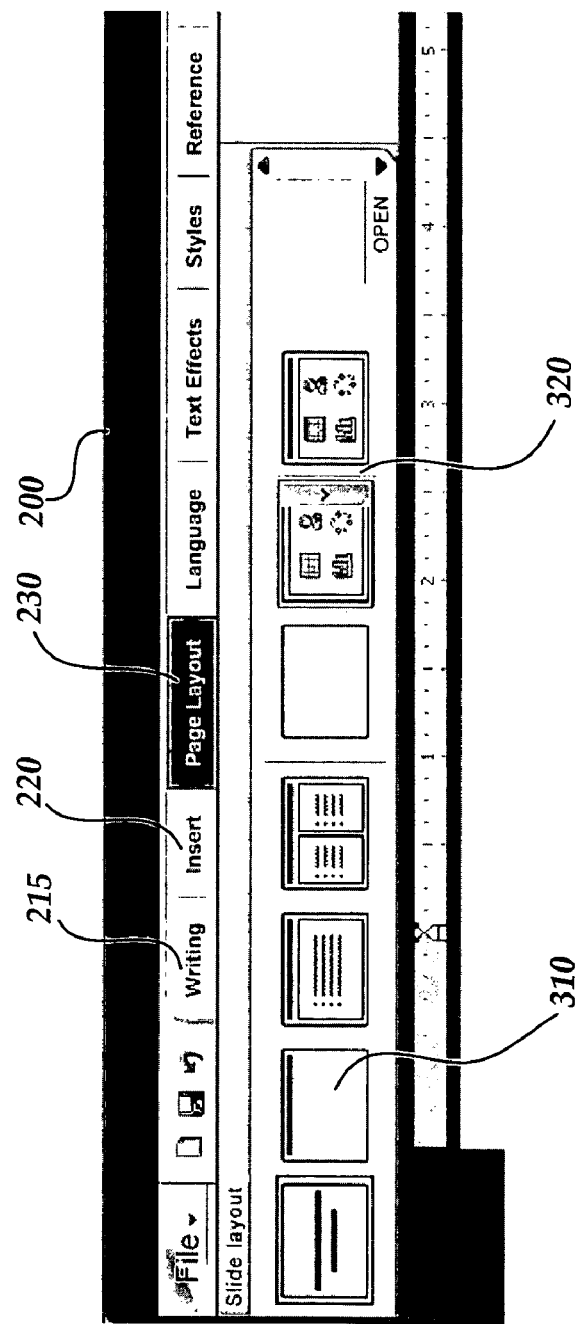
FIG. 3 illustrates a computer screen display showing a ribbon-shaped user interface for providing a gallery of images illustrating the application of one or more formatting options combinations to a selected object.

FIG. 3 illustrates the user interface 200 utilized in accordance with a slide presentation application 135. According to the example user interface 200 illustrated in FIG. 3, the "Page Layout" tab 230 is selected for displaying one or more logical groupings of selectable functionality controls for applying functionality to a selected object or document under a page layout task. In accordance with embodiments of the present invention, selection of the "Page Layout" tab 230 causes the presentation of a number of images 310, 320 representative of formatting options combinations that may be applied to the selected document. That is, a gallery of images is presented to the user where each image represents the way in which the selected document or object will be formatted if the formatting options combination illustrated by a given image is applied to the selected document or object.

As described above, a gallery of images such as those illustrated and described herein may be launched for use by selecting a task-based tab, for example the "Page Layout" tab described above. Alternatively, a gallery of images may be launched for use by selecting an object in a document. According to another embodiment, a gallery of images described herein may be launched in response to inserting an object into a document. For example, if a table object is inserted into a document, a gallery of images showing formatting options combinations that may be applied to table objects may be automatically launched to provide a user with a number of potential formatting options that may be automatically applied to the table object as described herein. In addition, a gallery of images as described herein may apply to an implied selection, for example a whole document, slide, spreadsheet and the like, as opposed to a specific selection, for example a particular area of a document, slide, spreadsheet or other or to a specific object contained therein.

According to embodiments of the present invention, all commands necessary for applying a given formatting options combination to a selected document or object are executed by selecting the associated displayed image from the user interface 200. That is, if the user sees an image in the gallery of images in the user interface 200 that is representative of formatting options the user desires to have applied to a selected document or object, the user may select the desired image, and the formatting options combination is automatically applied to the selected document or object. For example, if the user is preparing a slide using a slide presentation application, or if the user is typing a letter or memorandum using a word processing application, the user may select the "Page Layout" tab 230 to display a gallery of images showing potential page layout formatting options. If the user sees a particular image in the gallery of images that prescribes a page layout of "all text centered," for example, the user may select that image, and all required commands necessary for formatting the user's document accordingly are executed on the selected document. Thus, the user is not required to search one or more formatting menus for commands necessary for formatting the document or object. The functionality according to the present invention is particularly helpful when formatting a desired document or object requires a complex series of formatting commands in order to create the desired formatting.

According to embodiments of the present invention, the images comprising the gallery of images, described herein, may be static images illustrating an example of how an object formatted according to a selected image will be displayed. Alternatively, the gallery of images may be comprised of one or more dynamically produced images showing how the actual selected object or document will be displayed upon selection of a given image. For example, a static representation may show a generic image, such as a generic picture, rotated, shaded, or otherwise formatted according to a set of options, which, if selected, will apply to a selected object. On the other hand, a dynamic image may be in the form of a bitmap generated and displayed of the actual object selected by the user from the user's document with the formatting options combination applied. For example, if a picture image in a user's document is a picture of the user's family pet, a dynamic image showing rotation of the picture 90° will show a bitmap image of the user's actual family pet shown in a 90° rotation. A static image, on the other hand, may show a canned picture image such as a landscape image or clipart image rotated according to the formatting options associated with the image.

The illustrations and descriptions provided below, with respect to FIGS. 4 through 10, show application of embodiments of the present invention with respect to picture objects. As should be understood by those skilled in the art, the illustrations provided with respect to FIGS. 4 through 10 are for purposes of example only and do not limit application of embodiments of the present invention with respect to other types of formatting options combinations. That is, formatting options combinations may be illustrated for any type of formatting options that may be applied to selected documents or objects. For example, formatting options combinations may be illustrated in a gallery of images for text formatting options, including fonts, text justification, text size, text coloring, and the like. Likewise, formatting options combinations may be illustrated in a gallery of images for various desktop publishing documents, including advertisement flyers, news articles, business documents, and the like. Indeed, any formatting options combination applicable to any document or object may be illustrated in an image in a gallery of images, and all commands necessary for applying the formatting options combination to a document or document object may be "rolled up" and executed by selection of the formatting options combination image. Moreover, the images presented in a gallery of images may include information about formatting options combinations associated with given images. For example, a given image may include text descriptions. That is, a gallery of images may include one or more individual text descriptions that describes one or more formatting options combinations that may be applied to a selected or inserted object.

Figure 4:
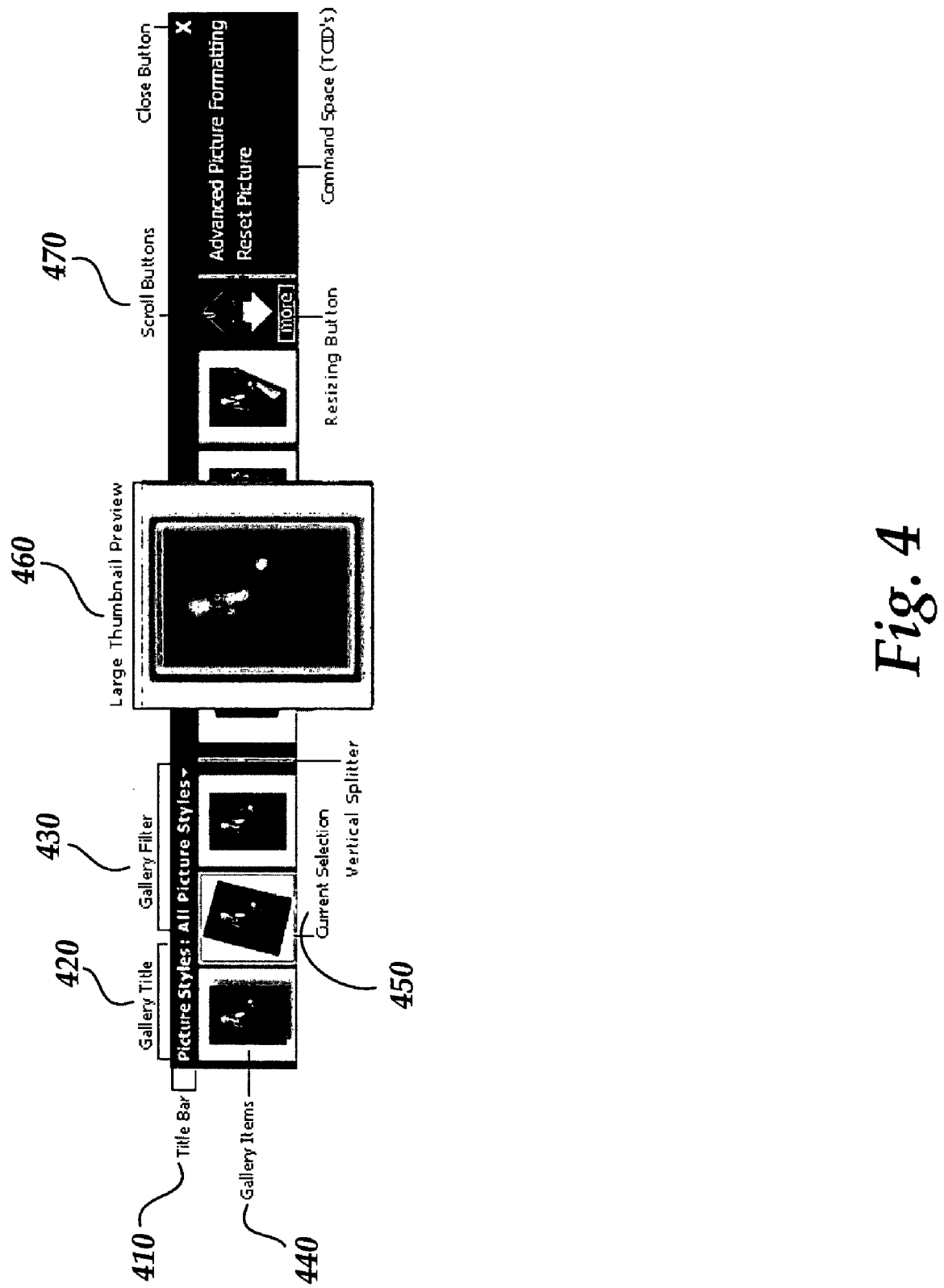
FIG. 4 illustrates a computer screen display showing a ribbon-shaped user interface for providing a gallery of images showing the application of one or more formatting options combinations to a selected object.

According to embodiments of the present invention, the gallery of images may be presented as an "in-ribbon" gallery of images disposed horizontally within the ribbon-shaped user interface 200, as illustrated in FIG. 3. Referring to FIG. 4, components of an "in-ribbon" gallery of images are illustrated. The in-ribbon gallery of images includes a title bar 410 for identifying the nature of the gallery of images. A gallery title 420 identifies the type of images displayed in the gallery of images and a gallery filter 430 identifies one or more subsets of the gallery of images that is displayed to the user. For example, the gallery filter 430 may describe the images displayed to the user as all images, most used images, my images, and the like. A large thumbnail preview 460 is illustrated in FIG. 4 for allowing the user to focus on a given image without applying the formatting options combination of the image to a selected object or document so that the user may see a preview of attributes of the image. The scroll buttons 470 may be utilized in the "in-ribbon" gallery of images where more images are available than may be displayed in the user interface 200 based on available space. Accordingly, the scroll buttons 470 allow the user to scroll through all available images before selecting a particular image. The current selection 450 shows a highlighted image representative of the formatting options combination that is presently applied to the selected object or document.

According to an embodiment of the invention, an expanded "in-ribbon" gallery of images may be displayed upon selection of a control such as the "Resizing Button" illustrated in FIG. 4. Selection of the "Resizing Button" may expand the gallery of images for displaying additional images. Upon expansion of the gallery, it may be displayed such that the gallery extends down and out of the user interface 200 to make room for additional selectable controls (images) similar to the expanded gallery illustrated in FIG. 7 (described below).

Figure 5:
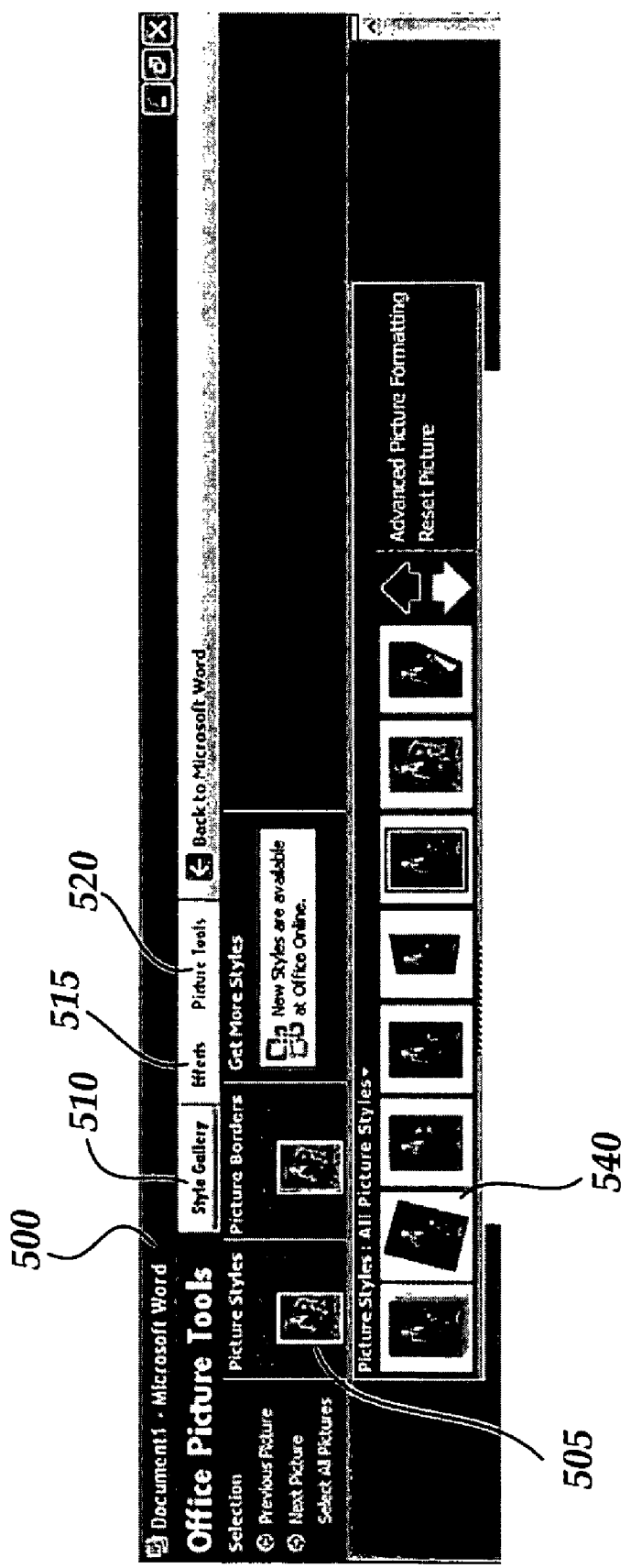
FIG. 5 illustrates a computer screen display showing a drop-down gallery of images showing the application of one or more formatting options combinations to a selected object.
Figure 6:
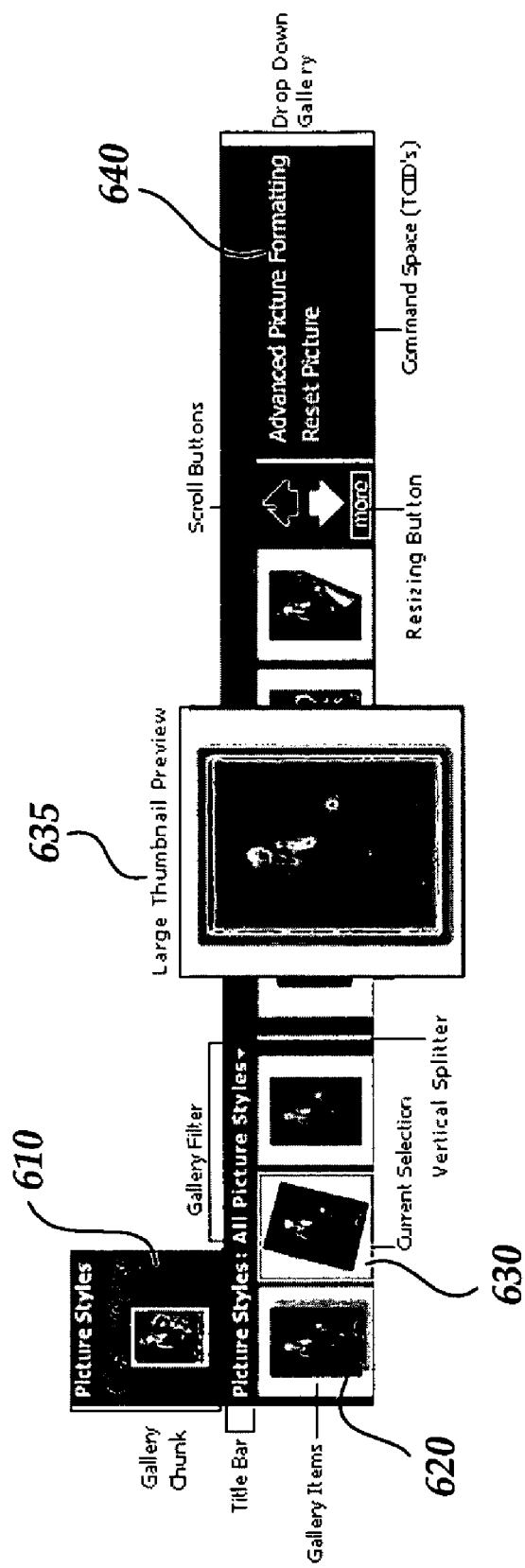
FIG. 6 is a computer screen display illustrating components of a drop-down gallery of images showing the application of one or more formatting options combinations to a selected object.

As shown in FIG. 5, a "drop-down" gallery of images is illustrated. According to a drop-down gallery of images, the gallery of images is not displayed within the ribbon-shaped user interface 500, but the gallery of images is displayed horizontally below the user interface 500. According to embodiments of the present invention, a drop-down gallery of images may be utilized when selection of a given task-based tab, such as the "Style Gallery" tab 510, results in the presentation of multiple types of formatting options combinations that may be applied to the selected document or object. For example, referring to FIG. 5, selection of the "Style Gallery" tab 510 results in the presentation of a "Picture Styles" section 505, a "Picture Borders" section, and a "Get More Styles" section. Advantageously, display of the gallery of images below the user interface 500 allows the user to browse the gallery of images without being obstructed from viewing other potential selectable controls associated with the selected top-level task-based tabs 510, 515, 520. As illustrated in FIG. 6, the drop-down version of the gallery of images is similar to the in-ribbon gallery of images but for its display beneath the user interface 200, 500.

Figure 7:
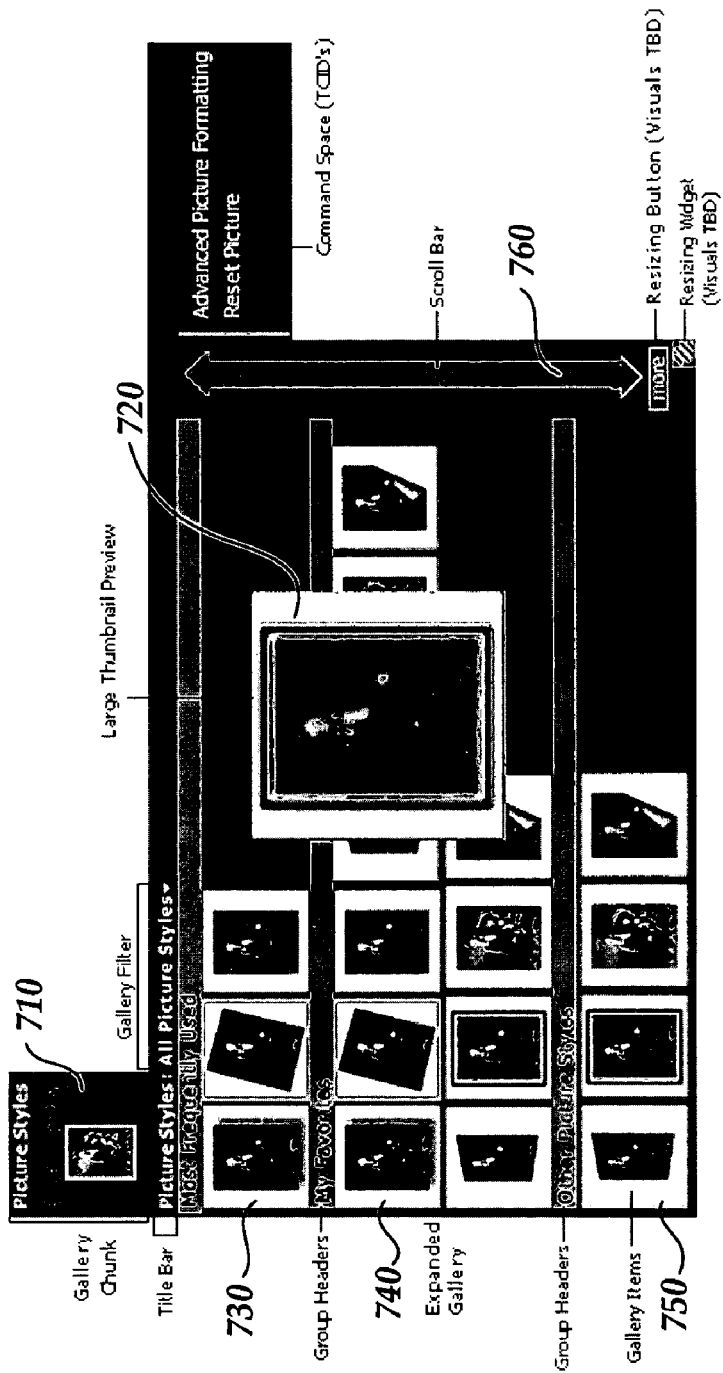
FIG. 7 illustrates the components of an expanded drop-down gallery of images illustrating the application of one or more formatting options combinations to a selected object.

Referring now to FIG. 7, an expanded drop-down gallery of images may be displayed where multiple types of images responsive to the selected gallery of images may be displayed in a single drop-down gallery of images. For example, the drop-down gallery of images illustrated in FIG. 7 shows a "Most Frequently Used" gallery of images 730, a "My Favorites" gallery of images 740, and an "Other Picture Styles" gallery of images 750.

Figure 8:
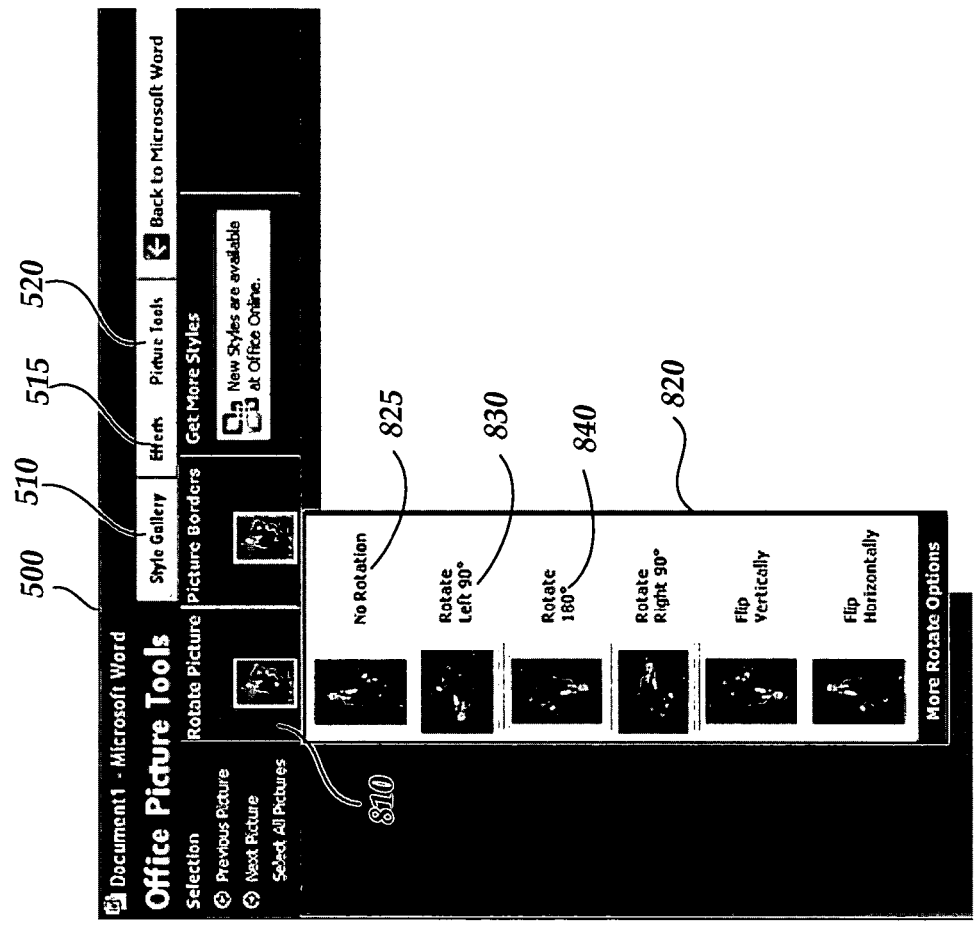
FIG. 8 illustrates a computer screen display of a drop-down menu of images illustrating application of one or more formatting options combinations to a selected object.

Referring now to FIG. 8, a visual picker gallery of images is displayed. A visual picker gallery of images drops down from the ribbon-shaped user interface 500. The visual picker gallery of images may be used as described above to "roll up" a common set of formatting commands or options and to provide a visual, easy-to understand representation of common formatting options that may be otherwise difficult to select by a given user. The visual picker gallery of images is similar to the "in-ribbon" and "drop-down" gallery of images described above in that the images may be static images or the images may be live images that may be dynamically altered based on user input and based on the actual selected object to which the images apply. After selection of a task-based tab 510, 515, 520, the plurality of selectable functionality controls 810 are displayed in the user interface 500. For example, as illustrated in FIG. 8, a "Rotate Picture" control, a "Picture Borders" control and a "Get More Styles" control are displayed in the user interface 500. If the user has an embedded picture object in a selected document and the user desires to rotate the selected picture object, the user may select the "Rotate Picture" control 810 to launch the visual picker gallery of images 820. As shown in the drop-down gallery of images, a variety of picture rotation options are provided to the user. For example, a "No Rotation" option 825, a "Rotate Left 90°" option 830, and a "Rotate 180°" option 840 are provided. Other options include "Flip Vertically" and "Flip Horizontally." As shown at the bottom of drop-down gallery of images 820, a "More Rotate Options" button is provided to allow the user to select additional images for application to a selected picture object.

As described herein, each image is associated with a set of formatting options and commands such that selection of any of the images causes the associated formatting options and commands to automatically be executed on the selected object. For example, if the user desires to rotate the selected object 180° from its present orientation, the user may select the "Rotate 180°" image 840 to automatically cause the selected object to be rotated 180°. Advantageously, because the gallery of images provides a visual representation of the result of applying a set of formatting options to the selected object, the user knows in advance the effect of applying the associated formatting options combination to the selected object or document. Accordingly, the user is not required to search through a variety of formatting options menus to determine the effect of different formatting options combinations on a selected object by trial and error.

Figure 9:
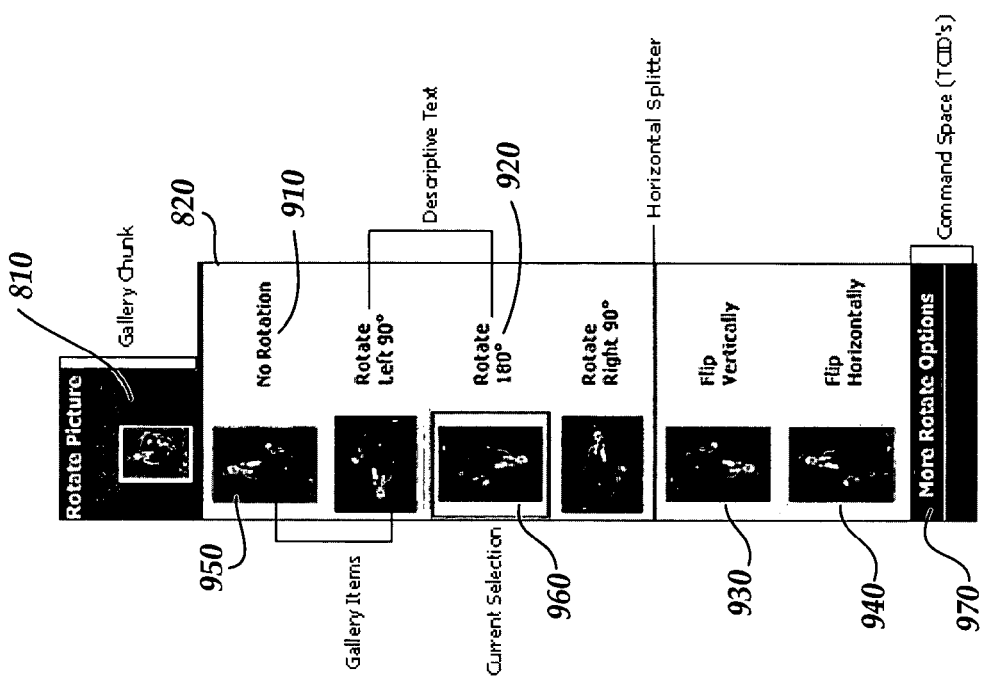
FIG. 9 is a computer screen display illustrating components of a drop-down menu of images illustrating application of one or more formatting options combinations to a selected object.

Referring to FIG. 9, components of the visual picker gallery of images are illustrated. The "Rotate Picture" control 810 illustrates a selectable functionality control displayed in the user interface 500 upon selection of a given task-based tab. The images 930, 940, 950, 960 illustrate static or dynamic representations of application of a given set of formatting options to a selected object. The descriptive text 910, 920 provides descriptive information to the user regarding the nature of the formatting options combination applied to the illustrated image. As described above, the "More Rotate Options" button 970 is illustrative of a button that may be disposed in the drop-down gallery of images for selecting additional potential formatting options combinations not displayed with the initial display of images.

Figure 10:
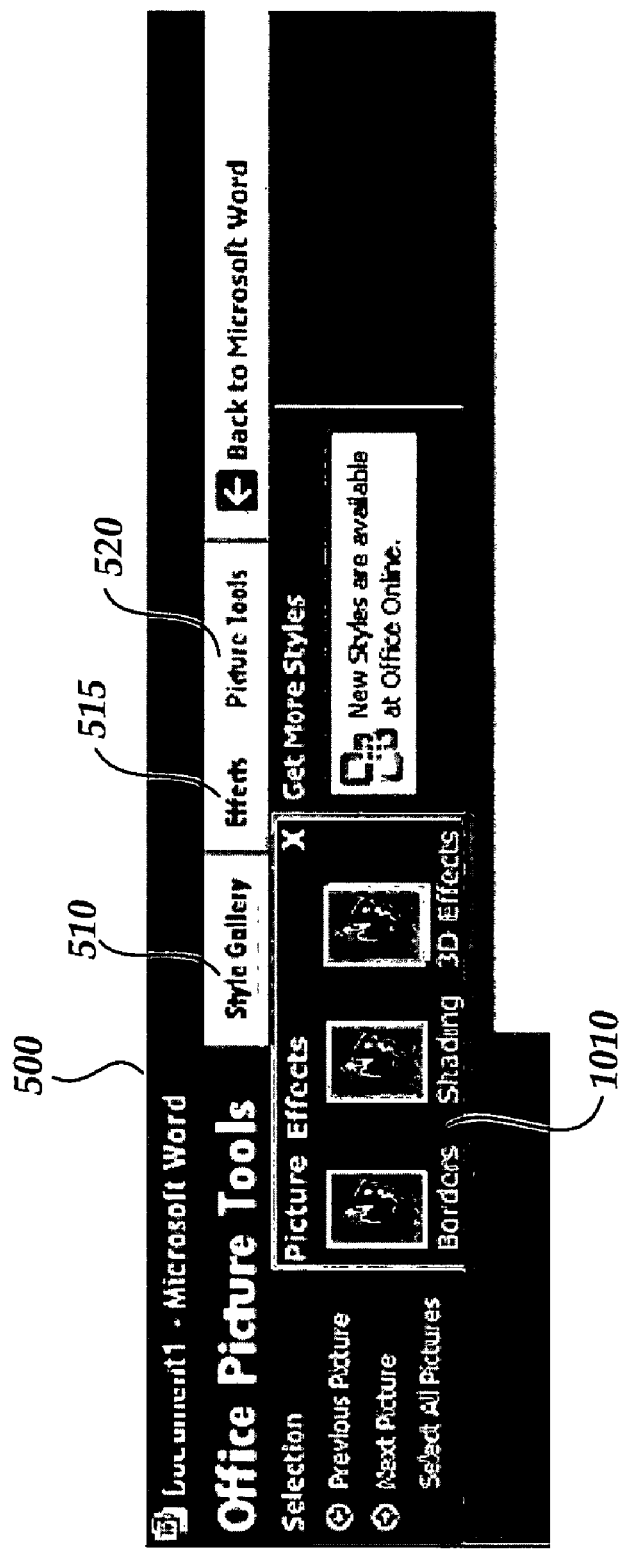
FIG. 10 illustrates a computer screen display showing the hosting of a plurality of formatting types where each type is associated with a gallery of images illustrating the application of one or more formatting options combinations to a selected object.

Referring to FIG. 10, selection of a given task-based tab 510, 515, 520 may cause a presentation of multiple galleries of images hosted in a single selectable functionality control section 1010. For example, the selectable functionality control section 1010 includes three individual galleries hosted under a section headed "Picture Effects." If the user desires to first apply formatting options combinations associated with one of the hosted galleries, the user may select the hosted gallery to cause a drop-down gallery of images, as illustrated in FIGS. 5 and 6, to be displayed beneath the user interface 500. The user may then select to have formatting options combinations provided thereby to a selected object or document. If the user next decides to apply formatting options combinations associated with one of the other hosted galleries, for example the "Shading" Gallery, the user may select the "Shading Gallery" to display a drop-down gallery of images showing different formatting options combinations associated with shading a selected object or document.

Figure 11:
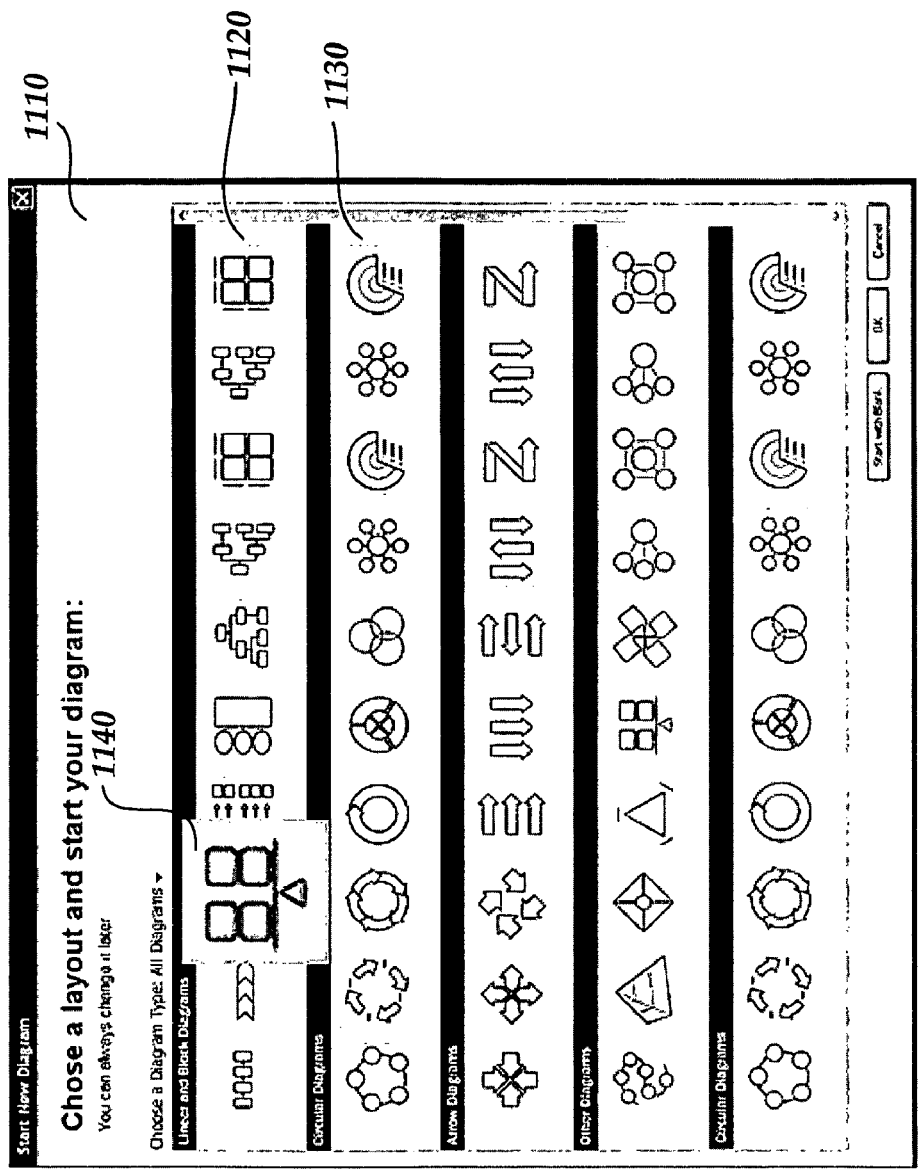
FIG. 11 illustrates a gallery of images illustrating the application of one or more formatting options combinations to a selected object hosted in a modal dialog box.

Referring now to FIG. 11, according to an alternative embodiment of the present invention, a gallery of images may be hosted in a modal or modeless dialog 1110 that may be displayed on the user's computer display screen over a document or object. As shown in FIG. 11, a plurality of images 1120, 1130 may be displayed in the gallery of images hosted in the dialog to allow a user to select a given image for application to a selected document or object, as described herein. The image 1140 is illustrative of a larger preview image for showing application of a given formatting options combination to a selected document or object. Additionally, a drop-down gallery of images, as described above with reference to FIG. 5, may be displayed under or adjacent to or otherwise in response to a selection of a given image or control in the dialog. For example, a given image contained in the dialog 1110 may be representative of a number of formatting options combinations that may be applied to a document or object. Selection of such an image may cause the display of a drop-down menu hosting a one or more images representing application of the available formatting options combinations.

Figure 12:
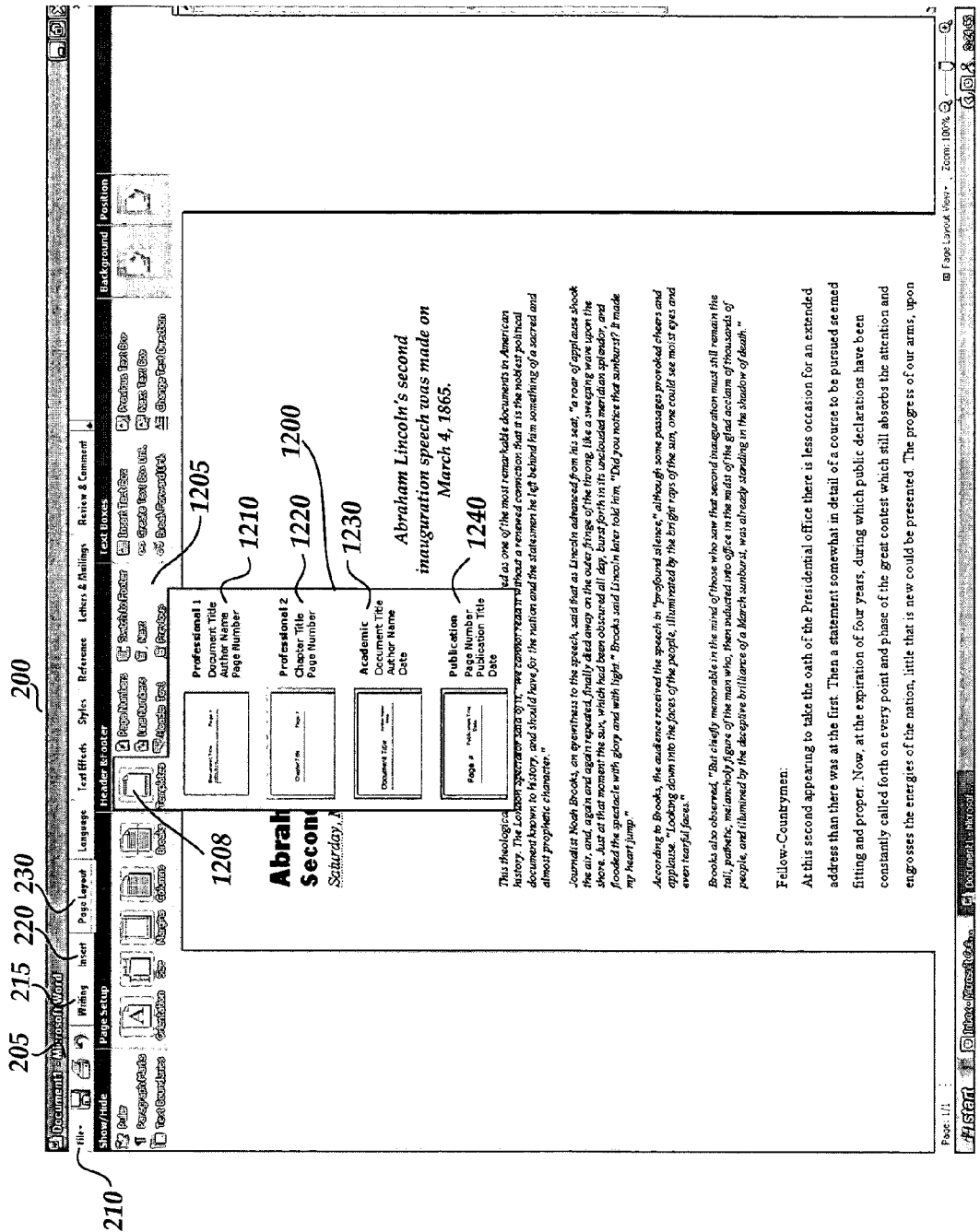
FIG. 12 is a computer screen display illustrating a drop-down menu of a plurality of images where each image illustrates the application of a given formatting options combination to a selected object.

FIG. 12 illustrates the presentation of a drop-down gallery of images 1200 that is dropped beneath a user interface 200 utilized by a word processing application 125. As illustrated in FIG. 12, "Page Layout" task-based tab 230 is selected so that one or more selectable functionality controls groupings are displayed in the user interface 200 for applying functionality to a selected document or object in association with a page layout task. Under the selectable functionalities control section headed "Header & Footer," a "Templates" control 1208 is provided. Selection of the templates control 1208 causes a drop-down gallery of images 1200 to be displayed to present to a user one or more images showing application of selected formatting options combinations to a document. If the user determines that one of the formatting options images is desirable, the user may select the desired image, and all formatting options commands necessary for applying the desired formatting options combination to the selected document or object are executed.

As described herein, an improved user interface for displaying a gallery of images showing application of different formatting options combinations applicable to a selected object or document is provided. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for providing a gallery of formatting options in an improved user interface, the method comprising:
   receiving an indication of an insertion of a first object;
   in response to receiving the indication of the insertion of the first object, providing a gallery of formatting controls associated with editing the inserted first object, wherein each of the formatting controls contained in the gallery of formatting controls is associated with formatting attributes configured to be applied to the first object;
   displaying, in the user interface, a second object for illustrating how the first object will be formatted if the formatting attributes associated with any one of the formatting controls are applied to the first object;
   receiving a first type of selection of an image formatting control of the gallery of formatting controls, the first type of selection corresponding to a mouse over on the image formatting control;
   in response to receiving the first type of selection, dynamically applying image formatting attributes associated with the image formatting control to the first object, wherein dynamically applying the image formatting attributes associated with the image formatting control to the first object comprises temporarily editing the first object with the image formatting attributes associated with the image formatting control;
   receiving a second type of selection of the image formatting control of the gallery of formatting controls; and
   in response to receiving the type of second selection, applying the image formatting attributes associated with the image formatting control to the first object.

2. The method of claim 1, wherein providing the gallery of formatting controls includes providing the gallery of formatting controls in a drop-down menu displayed underneath the associated tab of the user interface.

3. The method of claim 2, further comprising expanding the drop-down menu containing the gallery of formatting controls to display in the drop-down menu additional formatting controls associated with additional formatting attributes configured to be applied to the first object.

4. The method of claim 1, wherein providing the gallery of formatting controls includes providing the gallery of formatting controls in a dialog displayed in a software application workspace.

5. The method of claim 1, wherein providing the gallery of formatting controls includes providing a plurality of the gallery of formatting controls for selection.

6. The method of claim 5, further comprising:
   receiving a selection of one of the plurality of the gallery of formatting controls; and
   displaying formatting controls contained in the selected gallery of formatting controls.

7. The method of claim 6, further comprising displaying the formatting controls contained in the selected gallery of formatting controls in a drop-down menu of formatting controls.

8. The method of claim 1, upon receiving an indication of loss of user input device focus on the first image formatting control, reversing the dynamic application of the first image formatting attributes associated with the first image formatting control to the first object.

9. A computer implemented method for providing a gallery of formatting options in an improved user interface, the method comprising:
   displaying tabs disposed in an upper row of the user interface, each of the tabs identifying a task to be performed on a selected object;
   receiving a first selection of one of the tabs, wherein the selected one of the tabs is operative, upon selection, to cause a display of a gallery of image formatting controls in a lower row underneath the upper row of the user interface;
   in response to the first selection, displaying the gallery of image formatting controls, wherein each image formatting control contained in the gallery of image formatting controls is associated with image formatting attributes to be applied to the selected object;
   displaying, within the gallery of image formatting controls, a visual representation of the selected object associated with each of the image formatting controls;
   receiving an indication of mouse-over focus on the visual representation of the selected object;
   in response to receiving the indication of mouse-over focus on the visual representation of the selected object, dynamically modifying the selected object with the image formatting attributes corresponding to an image formatting control associated with the visual representation;

receiving an indication of loss of mouse-over focus on the image formatting control of the gallery of image formatting controls;

in response to receiving the indication, removing the image formatting attributes associated with the previously focused image formatting control from the selected object;

receiving a second selection of the image formatting control of the gallery of image formatting controls; and in response to receiving the second selection, applying the image formatting attributes associated with the image formatting control to the first object.

10. The computer implemented method of claim 9, further comprising:

receiving an indication of loss of user input device focus on the image formatting control of the gallery of image formatting controls;

in response to receiving the indication, removing the image formatting attributes associated with the previously focused image formatting control from the selected object;

receiving a second selection of the image formatting control of the gallery of image formatting controls; and in response to receiving the second selection, applying the image formatting attributes associated with the image formatting control to the first object.

11. The computer implemented method of claim 9, wherein the gallery of image formatting controls is disposed in a drop-down menu displayed underneath the associated tab of the user interface.

12. The computer implemented method of claim 9, wherein the gallery of image formatting controls is disposed in an expandable drop-down menu containing additional formatting controls associated with additional formatting attributes configured to be applied to the selected object.

13. The computer implemented method of claim 9, wherein the gallery of image formatting controls is disposed within a dialog displayed in a software application workspace.

14. A computer readable storage device having a set of instructions which when executed performs a method for providing a gallery of formatting options in an improved user interface, the method executed by the set of instructions comprising:

receiving a first indication of selection of a first object for formatting via a software application;

providing a gallery of image formatting controls organized in logical groupings associated with tasks to be performed by the software application, wherein each image formatting control contained in the gallery of image formatting controls is associated with image formatting attributes to be applied to the first object;

displaying, within the gallery of image formatting controls, a visual representation of the selected object associated with each of the formatting controls, the visual representation of the selected object being a modified representation of the selected object operative to illustrate how the selected object will be formatted if the image formatting attributes associated with a corresponding image formatting control are applied to the selected object;

receiving a second indication of mouse focusing over an image formatting control of the gallery of image formatting controls;

in response to receiving the second indication, dynamically applying image formatting attributes associated with the focused image formatting control to the selected object;

receiving a third indication of loss of mouse-over focus on the image formatting control of the gallery of image formatting controls; and in response to receiving the third indication, dynamically removing the image formatting attributes associated with the previously focused image formatting control from the selected object.

15. The computer readable storage device of claim 14, wherein providing the gallery of formatting controls includes providing the gallery of formatting controls in a drop-down menu displayed underneath the associated tab of the user interface.

16. The computer readable storage device of claim 15, further comprising expanding the drop-down menu containing the gallery of formatting controls to display in the drop-down menu additional formatting controls associated with additional formatting attributes configured to be applied to the first object.

17. The computer readable storage device of claim 14, wherein providing the gallery of formatting controls includes providing the gallery of formatting controls in a dialog displayed in a software application workspace.

18. The computer readable storage device of claim 14, wherein providing the gallery of formatting controls includes providing a plurality of the gallery of formatting controls for selection.

19. The computer readable storage device of claim 18, further comprising:

receiving a selection of one of the plurality of the gallery of formatting controls; and displaying formatting controls contained in the selected gallery of formatting controls.

20. The computer readable storage device of claim 19, further comprising displaying the formatting controls contained in the selected gallery of formatting controls in a drop-down menu of formatting controls.

21. The computer readable storage device of claim 14, upon receiving a fourth indication of a selection of the image formatting control of the gallery of image formatting controls, applying the image formatting attributes associated with the selected image formatting control to the first object.

22. A computer readable storage device having a set of instructions which when executed performs a method for providing a gallery of formatting options in an improved user interface, the method executed by the set of instructions comprising:

providing textually identified tabs in the user interface, wherein each of the tabs identifies a task to be performed on a selected object;

providing a gallery of formatting controls associated with a formatting task, wherein each of the formatting controls contained in the gallery of formatting controls is associated with formatting attributes to be applied to the selected object;

displaying, adjacent to each formatting control, a visual representation of the selected object illustrating how the selected object will be formatted if the formatting attributes associated with an adjacent formatting control are applied to the selected object, wherein the visual representation of the selected object comprises a generic object;

receiving a first selection of one of: an image formatting control of the gallery of formatting controls and a visual representation associated with the image formatting control, wherein the first selection comprises a mouse-over motion;

in response to receiving the first selection, dynamically modifying the selected object with image formatting attributes associated with the corresponding image formatting;

receiving an indication that the first selection is no longer being received; and in response to receiving the indication, reversing the image formatting attributes associated with the image formatting control from the selected object.

23. The computer readable storage device of claim 22, further comprising:

receiving a second selection of the image formatting control; and applying the image formatting attributes associated with the selected image formatting control to the selected object.

24. The computer readable storage device of claim 22, wherein providing the gallery of formatting controls includes providing the gallery of formatting controls within the user interface.

25. The computer readable storage device of claim 22, wherein providing the gallery of formatting controls includes providing the gallery of formatting controls in a drop-down menu.

26. The computer readable storage device of claim 25, further comprising expanding the drop-down menu containing the gallery of formatting controls to display in the drop-down menu additional formatting controls associated with additional formatting attributes configured be applied to the selected object.

27. The computer readable storage device of claim 22, wherein providing the gallery of formatting controls includes providing the gallery of formatting controls in a dialog displayed in a software application workspace.

28. The computer readable storage device of claim 22, wherein providing the gallery of formatting controls includes providing a plurality of the gallery of formatting controls for selection.

29. The computer readable storage device of claim 28, further comprising:

receiving a selection of one of the plurality of the gallery of formatting controls; and displaying formatting controls contained in the selected gallery of formatting controls.

30. The computer readable storage device of claim 29, further comprising displaying the formatting controls contained in the selected gallery of formatting controls in a drop-down menu of formatting controls.

* * * * *